US006744540B1

United States Patent
Masuda et al.

(10) Patent No.: US 6,744,540 B1
(45) Date of Patent: Jun. 1, 2004

(54) DOCUMENT END DETECTING UNIT, DOCUMENT READING UNIT, AND FACSIMILE APPARATUS

(75) Inventors: Ichizo Masuda, Yamatokoriyama (JP); Kenji Sugahara, Nara (JP); Takatomi Nishikawa, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 618 days.

(21) Appl. No.: 09/644,813

(22) Filed: Aug. 24, 2000

(30) Foreign Application Priority Data

Sep. 3, 1999 (JP) ............................................ 11-250498

(51) Int. Cl.[7] ............................................... H04N 1/04
(52) U.S. Cl. ..................... 358/488; 358/496; 358/461; 358/483; 250/208.1; 250/559.15
(58) Field of Search .............................. 358/488, 496, 358/461; 250/559.15, 559.36, 559.24, 559.25, 559.12, 208.1, 234–236; 356/384–386

(56) References Cited

U.S. PATENT DOCUMENTS 5,969,371 A * 10/1999 Andersen et al. ...... 250/559.15

FOREIGN PATENT DOCUMENTS

| JP | 3-42654 A | 2/1991 |
| JP | 4-40062 A | 2/1992 |
| JP | 7-115515 A | 5/1995 |
| JP | A8214108 | 8/1996 |
| JP | 410271267 A | * 10/1998 |
| JP | A2898453 | 3/1999 |
| JP | 11-177776 A | 7/1999 |
| JP | 02000174988 A | * 6/2000 |

* cited by examiner

Primary Examiner—Cheukfan Lee
(74) Attorney, Agent, or Firm—Birch, Stewart, Kolasch & Birch

(57) ABSTRACT

An object of the present invention is to provide a document end detecting unit which detects a front-end of a moving document with reliability. In a document reading unit equipped with a document end detecting unit, on the surface of a back member which is on the opposite side to a light-receiving section and a light source when viewed from a reference position, a slot which is substantially parallel to a moving direction of a document is formed. A detecting section detects a shade of a document front-end appearing at the slot based on data of the reflected light amount from light-receiving elements in the light-receiving section which receive light reflected from the slot of the back member, and detects timing when the document front-end reaches the reference position based on a result of detecting the shade. This allows a document front-end to be detected with reliability. A data accumulation section controls timing of starting accumulation of data of the reflected light amount from all the light-receiving elements of the light-receiving section in accordance with a detected timing that the document front-end reaches the reference position. As a result, a shade of a document front-end can be eliminated from a resulting image.

17 Claims, 11 Drawing Sheets

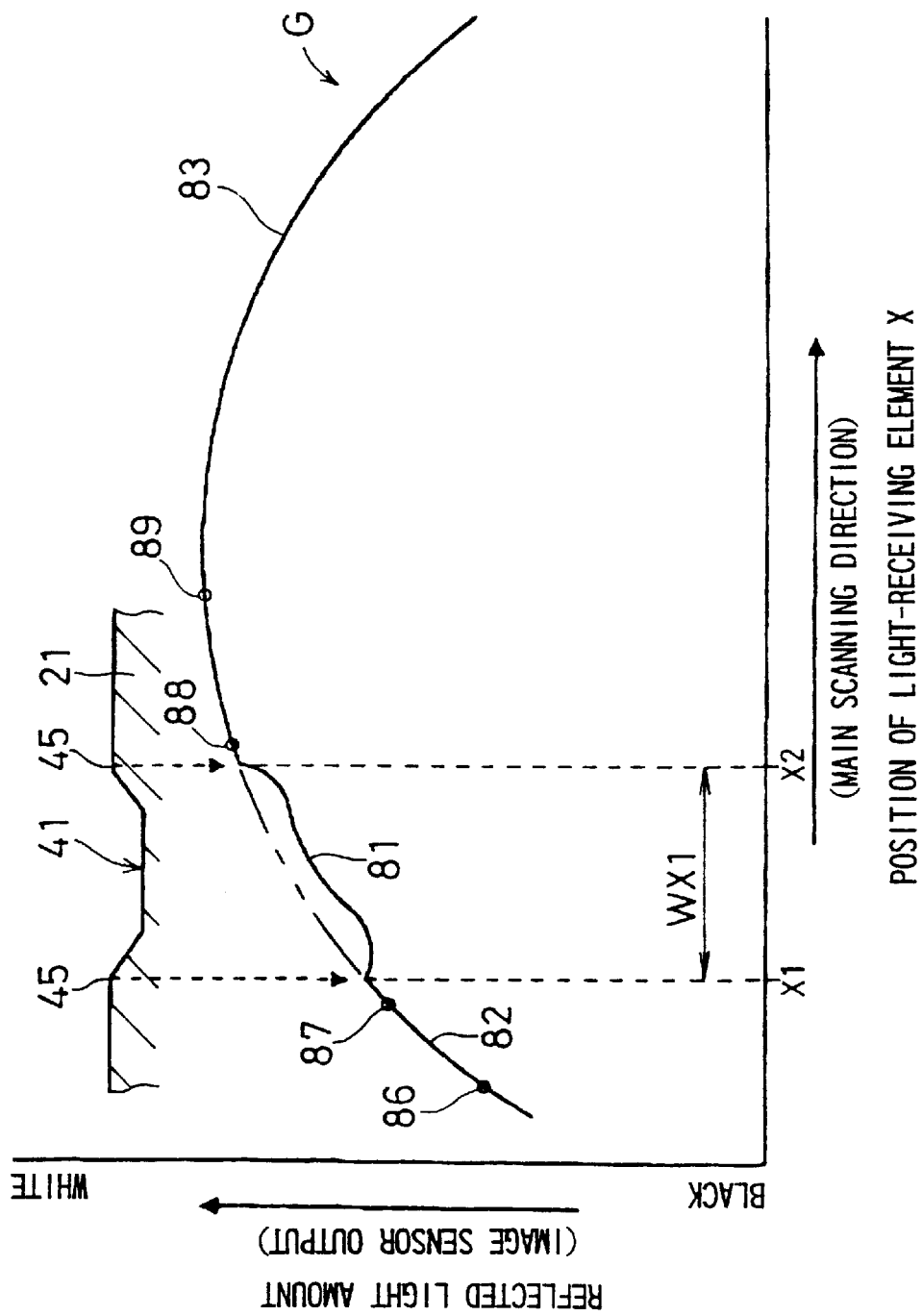

DOCUMENT

PRINTED/TRANSMITTED IMAGE

DOCUMENT

PRINTED/TRANSMITTED IMAGE

DOCUMENT

PRINTED/TRANSMITTED IMAGE

DOCUMENT

PRINTED/TRANSMITTED IMAGE

DOCUMENT END DETECTING UNIT, DOCUMENT READING UNIT, AND FACSIMILE APPARATUS

BACKGROUND OF THE INVENTION

1. Field of the Invention

The present invention relates to a document end detecting unit for detecting a front-end or rear-end of a document moving relatively to a light source, a document reading unit which reads a document moving relatively to a light-receiving section, and a facsimile apparatus equipped with a document reading unit.

2. Description of the Related Art

An electronic equipment for processing an image such as a facsimile apparatus is equipped with a document reading unit for optically reading a document. A document reading unit comprises a light-receiving section for reading a document, a light source, and a moving system for moving a document relatively to the light-receiving section. For reading a document, it is ideal that the light source illuminates a point to be read of the document from a direction forming an angle of 45° with the surface of the document and the light-receiving section reads the surface of the document from a perpendicular direction to the surface of the document. When a document is illuminated from one direction slanting to the surface of the document, a shade caused by the thickness of the document appears in close to either the front-end or rear-end of the document. A front-end of a document is an end on the downstream side in the document moving direction, and a rear-end of a document is an end on the upstream side in the document moving direction. In the case where the light source locates on the upstream side in the document moving direction from the light-receiving section, a shade caused by a front-end of a document appears. In the case where the light source locates on the downstream side in the document moving direction from the light-receiving section, a shade caused by a rear-end of a document appears. When a shade of the front-end or rear-end appears, the light-receiving section reads the shade, so that an unnecessary black line is inserted into an image which is a result of reading.

A first method of preventing insertion of a black line caused by a shade is to place light sources both on the downstream side and the upstream side in the document moving direction from the light-receiving section and illuminate a document from both the sides of the light-receiving section. In this case, it is difficult to completely delete both shades of the front-end and rear-end of a document at a time. Moreover, since a plurality of light sources need to be placed, the production cost of a document reading unit increases.

A second method of preventing insertion of a black line caused by a shade is to accurately detect a front-end or rear-end of a document causing a shade and, based on a result of detection, eliminate a shade of the front-end or rear-end of the document from an image which is a result of reading. In view of economy, the second method is appropriate for an electronic equipment such as a facsimile apparatus as a method of preventing insertion of a black line caused by a shade. In the second method, it is necessary to accurately detect a shade of a front-end or rear-end of a document when reading the document.

In Japanese Examined Patent Publication JP-B2 2898453, the applicant of this invention discloses a document reading unit which detects a front-end of a document based on a change of outputs of reading means caused by a shade of the front-end of the document. The document reading unit disclosed in JP-B2 2898453 detects a change of outputs of reading means caused by cutting off light reflected from a white backboard whose end on the downstream side in the document transferring direction is flat, transfers the document a predetermined distance from a point in time of detecting the change of outputs, and thereafter starts to read the document.

Japanese Unexamined Patent Publication JP-A 8-214108 (1996) discloses a method of detecting a front-end of a document in a document reading unit which moves a document with a light-receiving section fixed. The document reading unit disclosed in JP-A 8-214108 further comprises a white member, which is a roller for transferring a document. The light-receiving section of the document reading unit has a portion working as a light-receiving portion for detecting a front-end other than a portion working as a light-receiving portion for reading a document. The white member is opposed to the light-receiving portion for reading a document and the light-receiving portion for detecting a front-end. The surface of the white member is white, and in order to make the light reflectivity of part of the surface of the white member lower than that of the remainder, the part of the surface of the white member has a slot or a black-colored portion. The light-receiving portion for detecting a front-end is placed on the same board as the light-receiving portion for reading a document, on the upstream side in the document moving direction from the light-receiving portion for reading a document, and opposed to the slot or the colored portion. When a document starts to move, the light-receiving portion for detecting a front-end receives light reflected from the slot or the colored portion, and when the document comes between the slot or colored portion and the light-receiving portion for detecting a front-end, receives light reflected from the document. The document reading unit determines the difference between a color of the slot or colored portion and the white color of the background color of the document based on a change over time of the amount of the reflected light, and detects the front-end of the document based on the difference.

In the case of optically detecting a front-end or rear-end of a document causing a shade, the shorter a distance from the light-receiving portion for reading a document to the light-receiving portion for detecting a front-end is, the smaller an error in detection of a front-end or rear-end caused by transfer of a document is. The smaller an error in detection of a front-end or rear-end is, the more accurately a shade caused by a front-end or rear-end is eliminated from an image which is a result of reading. The best construction of a document reading unit is the one that the light-receiving portion for reading a document also works as the light-receiving portion for detecting a front-end. In the document reading unit disclosed in JP-A 8-214108, the light-receiving portion for reading a document and the light-receiving portion for detecting an end of a document are disposed separately. Moreover, since the document reading unit of JP-A 8-214108 does not detect a shade and has the slot for lowering the light reflectivity of part of the white member, the object thereof is different from that of the invention. In the case where instead of the slot a colored portion is provided on the surface of the white member in order to lower the light reflectivity, as described in JP-A 8-214108, it becomes difficult to detect the shade.

In a document reading unit, output data showing a light-receiving result of a light-receiving section are often subjected to shading correction. In shading correction, an output waveform showing a distribution of output data from light-receiving elements with respect to positions of the light-receiving elements composing a light-receiving section is compared with a reference waveform which is set in advance, and the output waveform is corrected in accordance with the reference waveform. The reference waveform is set individually in every document reading unit. For example, in a state where a light source illuminates a white member opposed to a light-receiving section for reading a document, the light-receiving section receives light reflected from the white member, whereby in accordance with an output waveform of data outputted as a result of light-reception, a reference waveform is formed. In the document reading unit of JP-A 8-214108 mentioned before, the white member has the slot or colored portion, so that the amount of light reflected from the white member is largely different depending on a place where light is reflected. Therefore, in the document reading unit of JP-A 8-214108, it is difficult to use an output waveform of data showing the amount of light reflected from the white member as a reference waveform.

SUMMARY

An object of the present invention is to provide a document end detecting unit which is capable of optically detecting a front-end or rear-end of a document with accuracy, a document reading unit, and a facsimile apparatus.

The invention provides a document end detecting unit which detects one of an upstream end and downstream end in a moving direction of a document moving relatively to a predetermined reference position, the document end detecting unit comprising:

a light source for illuminating the reference position from a downstream side or upstream side in the moving direction of the document;

light-receiving means for receiving reflected light coming through the reference position;

a back member opposed to the light-receiving means and the light source across the reference position; and detecting means for detecting the one end of the document, wherein a slot whose longitudinal direction is substantially parallel to the moving direction of the document is provided on a surface of the back member, and the detecting means detects a shade of the one end of the document appearing at the slot of the back member based on a light-receiving result of the light-receiving means, and detects the one end of the document based on a result of detecting the shade.

According to the invention, the document end detecting unit detects a shade appearing at the slot of the back member due to an end of a document, and detects either end of the document based on a result of detecting the shade. This allows appearance and disappearance of a shade to be detected with reliability, so that reliability on detection of either end of a document in the document end detecting unit according to the invention is increased enough to be more practicable than a conventional document end detecting unit which uses a back member having no slot.

In the document end detecting unit of the invention it is preferable that the detecting means detects disappearance timing of a shade of the downstream end in the moving direction of the document and regards the detected disappearance timing as timing when the downstream end in the moving direction of the document reaches the reference position.

According to the invention, in the document end detecting unit, the detecting means regards a detected disappearance timing of a shade of a downstream end in the moving direction of a document as timing when the end reaches the reference position. Timing when the downstream end in the moving direction of the document reaches the reference position coincides with disappearance timing of a shade. This enables the document end detecting unit to most reliably detect the downstream end in the moving direction of a document based on a shade appearing at the slot of the back member.

In the document end detecting unit of the invention it is preferable that the detecting means detects appearance timing of a shade of the downstream end in the moving direction of the document and regards a point in time when the document has relatively moved a predetermined distance from a position thereof at the detected appearance timing as timing when the downstream end in the moving direction of the document reaches the reference position.

According to the invention, in the document end detecting unit, the detecting means detects timing when the downstream end in the moving direction of the document reaches the reference position based on only appearance timing of shade of the downstream end in the moving direction of the document. This simplifies the construction for detecting a shade of a document end, so that the entire construction of the document end detecting unit is simplified.

In the document end detecting unit of the invention it is preferable that the color of the surface of the back member and the inner wall of the slot is white;

the light-receiving means is composed of a plurality of light-receiving elements arranged in parallel to a direction which is substantially orthogonal to the moving direction of the document;

light reflected from the slot of the back member and light reflected from the surface of the back member excluding the slot are respectively received by one or more light-receiving elements; and the detecting means:
  (1) judges whether the surface of the document is dark color or not based on the amount of reflected light received by a light-receiving element which should receive the light reflected from the surface of the back member excluding the slot, and
  (2) when the surface of the document is dark color, detects timing when the amount of reflected light received by the light-receiving element which should receive the light reflected from the surface of the back member excluding the slot becomes less than a predetermined light amount, and regards the detected timing as timing when the downstream end in the moving direction of the document reaches the reference position.

According to the invention, in the document end detecting unit, when the surface of the document is dark color, the detecting means regards timing when the amount of light reflected from the surface of the back member excluding the slot becomes less than a predetermined light amount as timing when the downstream end in the moving direction of the document reaches the reference position. This enables the document end detecting unit to detect a document end even when it is difficult to distinguish a shade from the surface of a document because the surface of the document is dark color.

In the document end detecting unit of the invention it is preferable that the back member has a plurality of slots, and
  the detecting means performs detection of a shade of a document end and detection of a position of the document end individually at points where the slots of the back member are formed.

According to the invention, in the document end detecting unit, detection of a shade of either end of a document and detection of a position of either end of a document are performed at the plurality of slots on the surface of the back member, respectively. As a result, a plurality of results of detecting the position of either end of the document can be found, so that it is possible to increase the precision in a position of one end and detect a skew of the document by using the detection results.

The invention provides a document reading unit comprising:

the document end detecting unit mentioned above;
moving means for moving at least one of the light-receiving means and the document to be read so that the document moves relatively to the light-receiving means in the document end detecting unit while passing through the reference position;
data accumulation means for accumulating data of reflected light amount from the light-receiving means as data of density of pixels composing an image; and
accumulation control means for causing the data accumulation means to start and finish accumulation of data in accordance with timing when the detecting means of the document end detecting unit detects either end of the document.

According to the invention, the document reading unit uses the document end detecting unit which uses a shade of either end of a document. Since the light-receiving means used for detection of a document end also works as light-receiving means for optically reading a document, an error in detection of a document end due to movement of the document is minimized, and a component count of the document reading unit is decreased. Since a data accumulation timing is controlled based on a result of detecting a document end by using a shade appearing at the slot of the back member, a shade of the document end is reliably eliminated from an image which is a result of reading a document at a point in time that data are accumulated in the data accumulation means. This increases the quality of an image in the data accumulation means.

In the document reading unit of the invention it is preferable that thee document reading unit further comprises reference waveform producing means for producing a reference waveform used for shading correction; and shading correction means for subjecting data of the reflected light amount from the light-receiving means to shading correction using the reference waveform, that the light-receiving means is composed of a plurality of light-receiving elements arranged in parallel to a direction substantially orthogonal to the moving direction of the document, and that the reference waveform producing means causes the light-receiving means to receive light reflected from a surface of the back member and regards an output waveform showing a relation between the reflected light amounts outputted from the respective light-receiving elements and positions of the respective light-receiving elements as the reference waveform.

According to the invention, the document reading unit performs shading correction using the reference waveform when reading a document. An output waveform obtained as a result of causing the light-receiving means to receive the light reflected from the surface of the back member is used as a reference waveform. This facilitates production of a reference waveform in consideration of variations in property of individual light-receiving means. In the case where such a reference waveform is used, the shading correction means is capable of performing shading correction with accuracy.

In the document reading unit of the invention it is preferable that an inclination angle of a side wall of the slot of the back member to a bottom surface of the slot is more than and less than 90°.

According to the invention, in the document reading unit, the gradient of the side wall of the back member slot is gentle, so that it is possible to treat the back member as a member with almost uniform reflectivity. This makes the reference waveform produced based on light reflected from the back member more accurate, so that the shading correction means is capable of performing shading correction with more accuracy.

In the document reading unit of the invention it is preferable that a surface of a border portion between a side wall of the slot of the back member and the bottom surface of the slot is curved.

According to the invention, in the document reading unit, an angle of a portion where a side wall of the slot of the back member rises from the bottom surface of the slot is gently curved, so that it is possible to treat the back member as a member with almost uniform reflectivity. This makes a reference waveform produced based on light reflected from the back member more accurate, so that the shading correction means is capable of performing shading correction with more accuracy.

In the document reading unit of the invention it is preferable that a surface of a border portion between a side wall of the slot of the back member and a surface of the back member is curved.

According to the invention, in the document reading unit, the portion where the slot falls from the surface of the back member is gently curved, so that it is possible to treat the back member as a member with almost uniform reflectivity. This makes the reference waveform produced based on light reflected from the back member more accurate, so that the shading correction means is capable of performing shading correction with more accuracy.

In the document reading unit of the invention it is preferable that the reference waveform producing means corrects the shape of the output waveform to a shape to be obtained in the case where the back member has no slot, and regards the corrected output waveform as a reference waveform.

According to the invention, in the document reading unit, when a reference waveform for shading correction is produced, part of the output waveform corresponding to the slot is corrected to obtain an output waveform in the case of no slot, so that a more accurate reference waveform is produced. With such a corrected reference waveform, it is possible to adopt such an ideal method as integrating light-receiving means for reading a document and light-receiving means for detecting a document end, and perform shading correction using the reference waveform with more accuracy.

In the document reading unit of the invention it is preferable that the reference waveform producing means corrects part of the output waveform corresponding to the slot by interpolation of both sides of the part of the output waveform.

According to the invention, in the document reading unit, the output waveform is corrected by interpolating the part of the output waveform corresponding to the slot by both the sides of the part of the output waveform. This allows a reference waveform to be corrected with ease and reliability by using only the output waveform.

In the document reading unit of the invention it is preferable that the document reading unit further comprises standard waveform storing means which previously stores a standard falling waveform showing a standard relation between the amount of light reflected from a back member having a slot and positions of the light-receiving elements and a standard reference waveform showing a standard relation between the amount of the light reflected from the back member having no slot and positions of the respective light-receiving elements, and that the reference waveform producing means corrects the output waveform based on the standard falling waveform and the standard reference waveform.

According to the invention, in the document reading unit, a reference waveform for shading correction is produced based on a result of reading the light reflected from the surface of the back member and the content stored in the standard waveform storing means. In producing a reference waveform, part of the output waveform corresponding to the slot is corrected, so that a more accurate reference waveform is produced.

In the document reading unit of the invention it is preferable that the accumulation control means sets timing of starting to accumulate data in the data accumulation means later than timing when either end of a document reaches the reference position, detected by the detecting means.

According to the invention, in the document reading unit, timing of starting to accumulate data is set later than timing when a document end reaches the reference position, detected by the document end detecting unit. This reliably removes a shade caused by a document end from an image which is a result of reading a document, so that the quality of an image is increased still more.

In the document reading unit of the invention it is preferable that the back member has a plurality of slots, the detecting means performs detection of a shade of a document end and detection of a position of either end of the document individually at points where the plurality of slots of the back member are formed, and the accumulation control means calculates the amount of skew of the document based on the difference in position of the document end detected at the plurality of slots, and sets timing of starting to accumulate data in the data accumulation means later than timing detected by the detecting means that either end of a document reaches the reference position, by a period of time corresponding to the calculated amount of skew.

According to the invention, in the document reading unit, timing of starting to accumulate data is set later than timing detected by the document end detecting unit that a document end reaches the reference position, by a period of time corresponding to the amount of skew of a document. This allows a front-end portion of the document which is not seen in an image due to removal of a shade to be reduced still more, thereby preventing a lack of information on a document due to removal of a shade in an image.

In the document reading unit of the invention it is preferable that the back member is a roller which is capable of rotating about a rotation axis, and the moving direction of a document is orthogonal to an axial direction of the rotation axis.

According to the invention, the document reading unit is constructed in such a manner that the light source and the light-receiving elements are fixed and a document moves. Since the back member is a roller, the back member is capable of working as one of the members of a document moving system. This makes it possible to downsize the document reading unit and decrease a component count. Therefore, the producing cost of the document reading unit is reduced.

The invention provides a facsimile apparatus comprising: the document reading unit mentioned above; and
a communication unit for sending data of an image accumulated in the data accumulation means of the document reading unit to a communication unit capable of receiving data of an image.

According to the invention, the facsimile apparatus comprises the document reading unit equipped with the document end detecting unit which uses a shade of a document end. With such a document reading unit, the precision in detection of a document end is increased, so that the facsimile apparatus is capable of performing a process associated with detection of a document end with more precision.

BRIEF DESCRIPTION OF THE DRAWINGS

Other and further objects, features, and advantages of the invention will be more explicit from the following detailed description taken with reference to the drawings wherein:

FIG. 10 is a graph showing a standard output waveform G of a downsized reading section in the case of causing the downsized reading section to read the surface of the back member 21 having the slot 41;

DETAILED DESCRIPTION OF THE PREFERRED EMBODIMENTS

Figure 1:
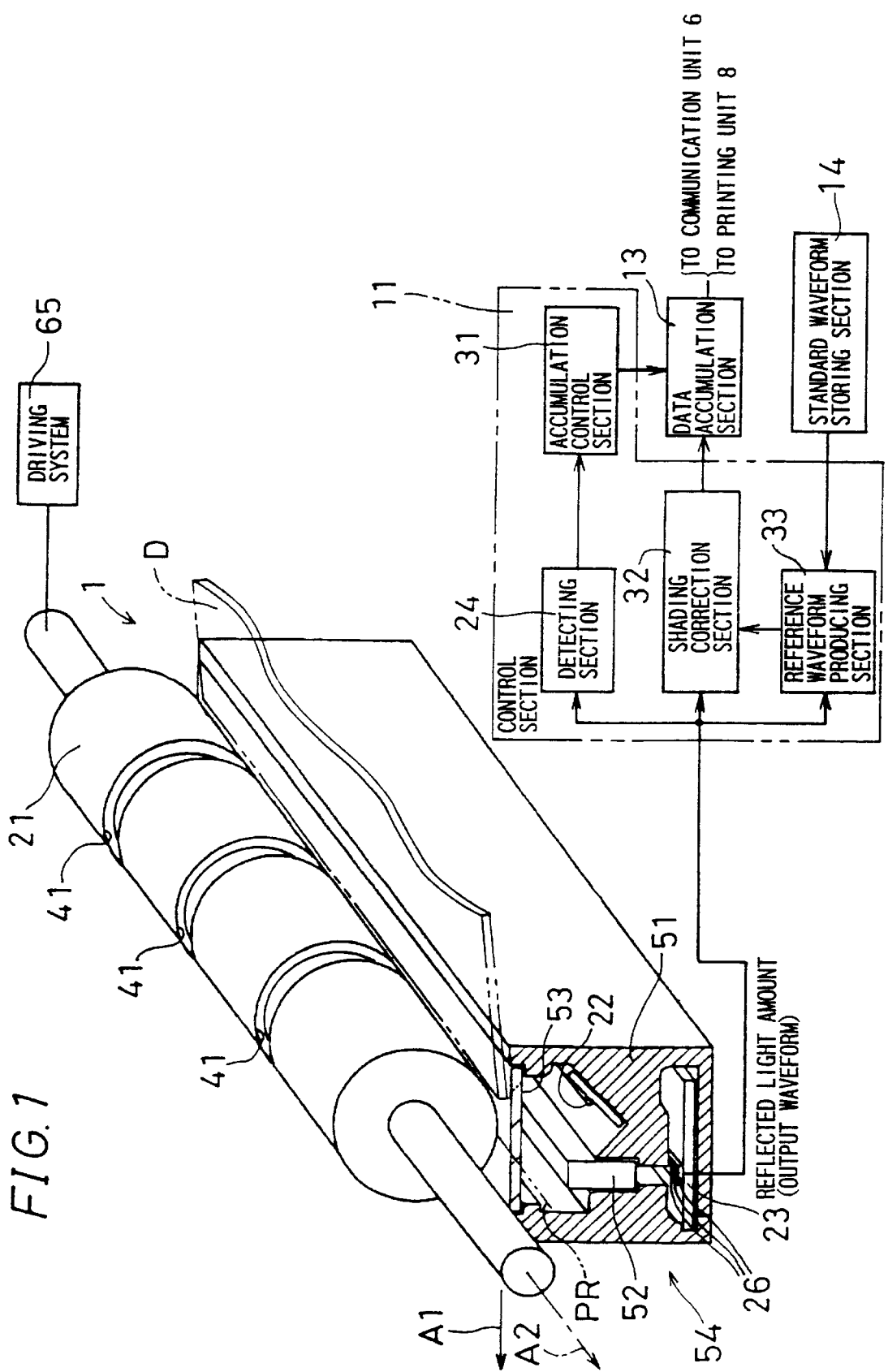
FIG. 1 is a perspective view schematically showing a construction of a document end detecting unit 1 which is an embodiment of the present invention.

Now referring to the drawings, preferred embodiments of the invention are described below.

Figure 2:
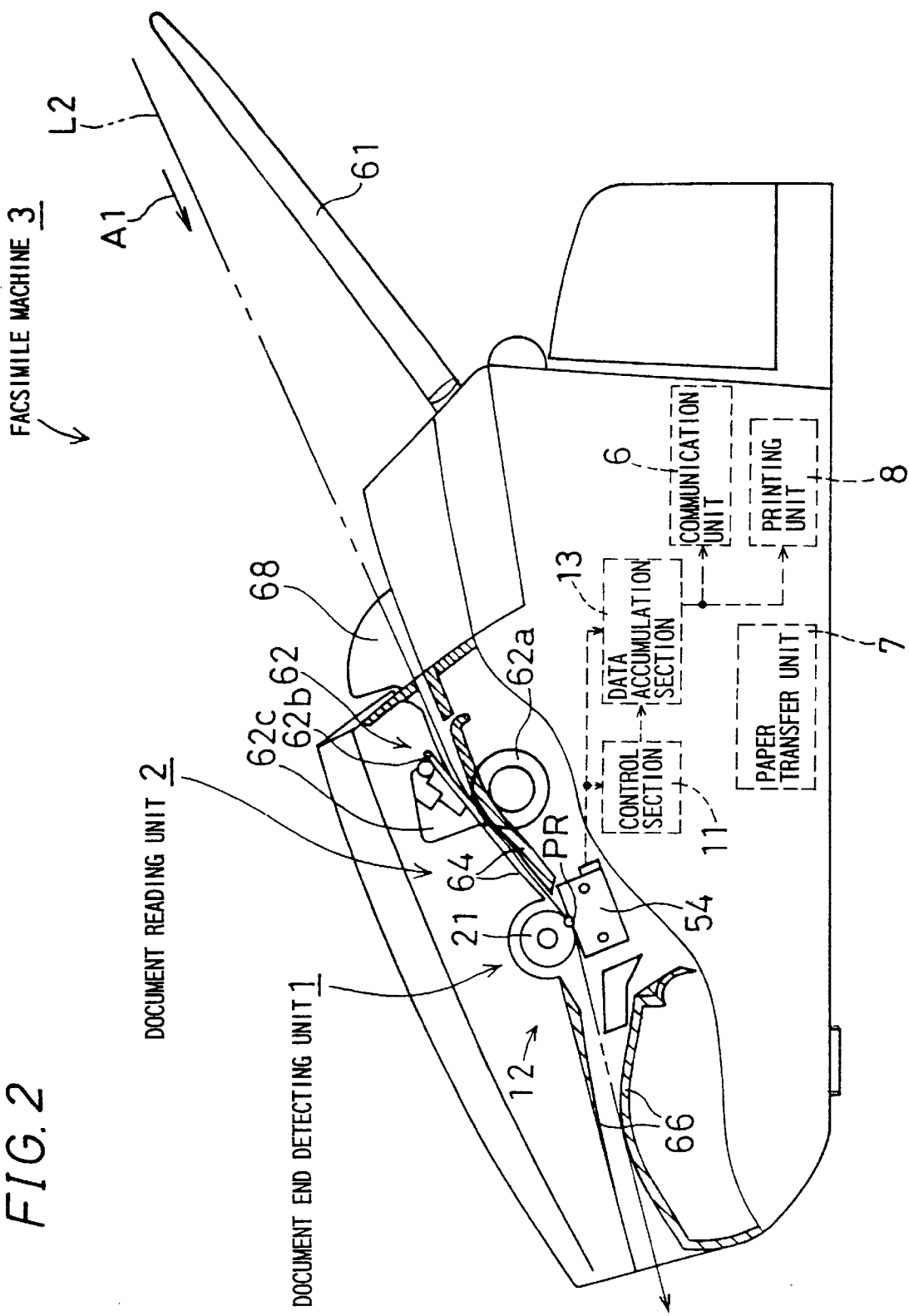
FIG. 2 is a side view showing a simplified construction of a facsimile apparatus 3 which comprises a document reading unit 2 equipped with the document end detecting unit 1 shown in FIG. 1.
Figure 3:
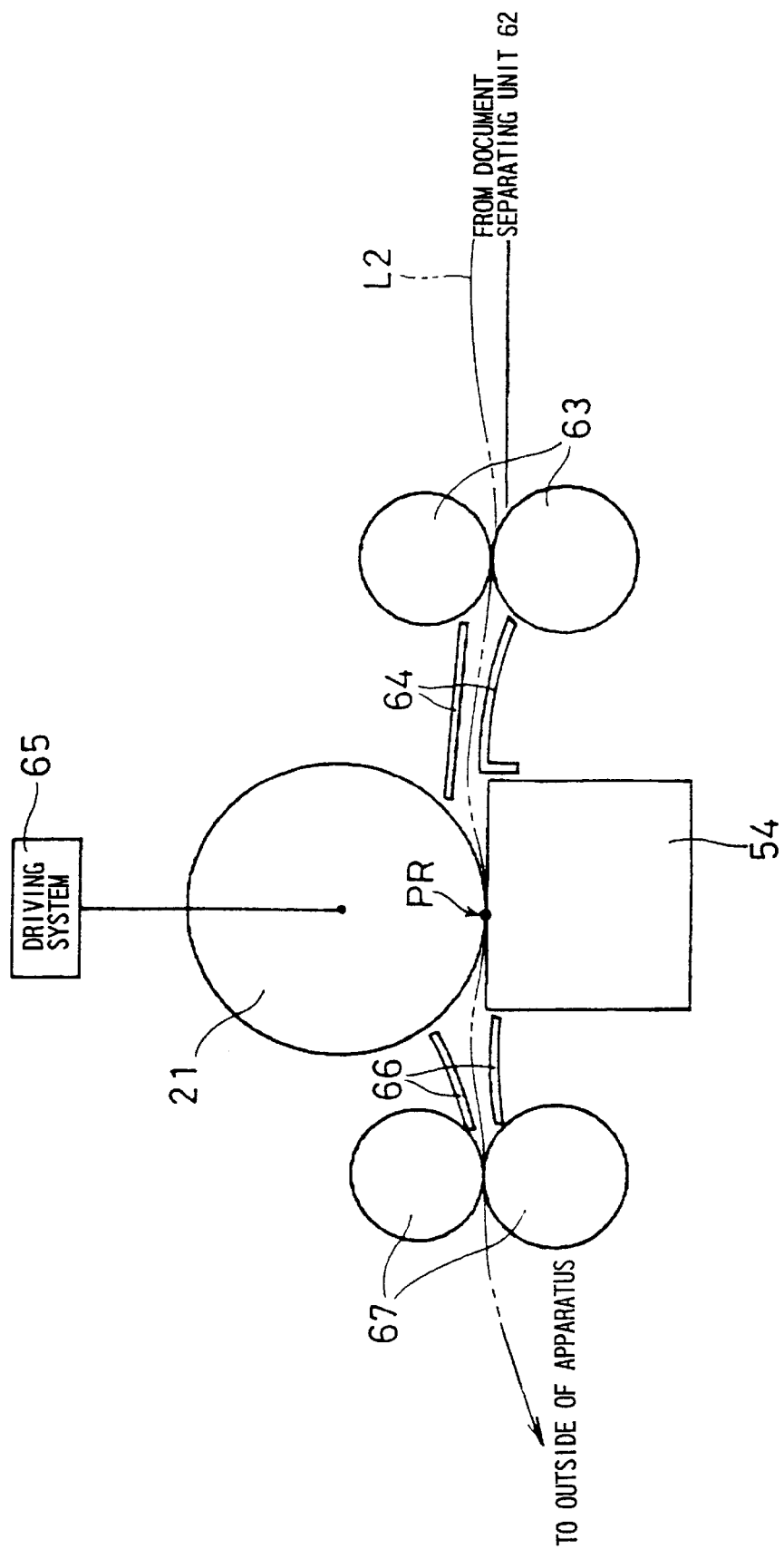
FIG. 3 is a diagram showing a simplified construction of the document end detecting unit 1 and the periphery thereof in the facsimile apparatus 3.

FIG. 1 is a perspective view schematically showing a construction of a document end detecting unit 1 which is an embodiment of the present invention. FIG. 2 is a side view showing a simplified construction of a facsimile apparatus 3 which comprises a document reading unit 2 equipped with the document end detecting unit 1 shown in FIG. 1. FIG. 3 is a diagram showing a simplified construction of the document end detecting unit 1 and the periphery thereof in the facsimile apparatus 3. In the side view of FIG. 2, a side surface of a housing of the facsimile apparatus 1 is partly cut off. FIGS. 1 to 3 will be explained together.

The facsimile apparatus 3 comprises, other than the document reading unit 2 equipped with the document end detecting unit 1, a communication unit 6, a paper transfer unit 7 and a printing unit 8. The document reading unit 2 comprises, other than the document end detecting unit 1, a control section 11, a document moving system 12, a data accumulation section 13 and a standard waveform storing section 14. The document end detecting unit 1 comprises a back member 21, a light source 22, a light-receiving section 23 and a detecting section 24. In this embodiment, the control section 11 has functions of an accumulation control section 31, a shading correction section 32, a reference waveform producing section 33 and the detecting section 24 of the document end detecting unit 1.

The construction of the facsimile apparatus 3 is schematically described below. The document reading unit 2 optically reads a document D of an object to be read, and produces data of an image of a result of reading. The communication unit 6 sends data of an image produced in the document reading unit 2 to another facsimile apparatus or a communication terminal which is capable of processing data of an image. Moreover, the communication unit 6 receives data of an image transmitted from another facsimile apparatus or a communication terminal which is capable of processing data of an image. Between the communication unit 6 and another facsimile apparatus or a communication terminal, a public network is interposed, for example. The paper transfer unit 7 stocks sheets of paper for printing an image and transfers a sheet of paper to the printing 8 in response to an operation of the printing unit 8. The printing unit 8 prints an image on a sheet of paper based on data of an image produced by the document reading unit 2 or data of an image transmitted or received by the communication unit 6.

The construction of the document reading unit 2 and the document end detecting unit 1 are schematically described below. The light-receiving section 23 is composed of a plurality of light-receiving elements 26 arranged in parallel to a direction which is substantially orthogonal to a moving direction A1 of the document D. An arrangement direction of the light-receiving elements 26, that is, a direction A2 which is orthogonal to the moving direction A1 of the document D is a so-called main scanning direction. At least one of the light-receiving elements 26 is used for both detecting a document end and reading a document, whereas other light-receiving elements 26 are used only for reading a document. On the surface of the back member 21, at least one slot 41 whose longitudinal direction is substantially parallel to the document moving direction A1 is disposed.

The moving system 12 moves at least one of the light-receiving section 23 and the document D so that the document D moves relatively to the light-receiving section 23 while passing through a predetermined reference position PR. The back member 21 is placed on the opposite side to the light-receiving section 23 and the light source 22 when viewed from the predetermined reference position PR which the document D should pass through. The light source 22 illuminates the reference position PR from the upstream or downstream side in the document moving direction A1 from the light-receiving section 23. All the light-receiving elements 26 of the light-receiving section 23 receive reflected light which comes passing through the reference position PR, and output data showing the amount of the reflected light. When the document D is illuminated from one direction slanting to the surface of the document D, a shade caused by the thickness of the document D appears at either the front-end or rear-end of the document D. The detecting section 24 detects a shade of either an upstream end or downstream end in the moving direction A1 of the document D which shade appears at the slot of the back member 21, based on a light-receiving result of the light-receiving section 23, and detects one end of the document D based on a result of detecting a shade.

The accumulation control section 31 controls at least one of timing of starting accumulation of data or timing of finishing accumulation of data by the data accumulation section 13 in accordance with timing when the detecting section 24 of the document end detecting unit 1 detects either end of the document D. The shading correction section 32 subjects data of the reflected light amount from the light-receiving section 23 to shading correction. Prior to execution of shading correction, the reference waveform producing section 33 produces a reference waveform used by the shading correction section 32. The data accumulation section 13 accumulates data of the reflected light amount. The entire data of the reflected light amount accumulated in the data accumulation section 13 become data of an image of a result of reading the document D. Data of an image in the data accumulation section 13 are supplied to the communication unit 6 or the printing unit 8.

Within the document reading unit 2 and the document end detecting unit 1, an image is treated in the state of data, so that 'an image' will contain a concept of 'data of an image' in the explanation hereinafter. Further, a problem associated with a front-end of the document D and a problem associated with a rear-end of the document D are based on the same principle, so that, in the explanation hereinafter, the light source 22 is to illuminate the reference position PR from the upstream side in the document moving direction A1 from the reference position PR, and only a front-end of the document D will be taken as an example for explanation. A front-end of the document D is an end on the downstream side in the document moving direction A1, whereas a rear-end of the document D is an end on the upstream side in the document moving direction A1. A problem associated with a rear-end of the document D will be explained by replacing 'a front-end of the document D' to 'a rear-end of the document D' and 'the upstream side in the document moving direction A1' to 'the downstream side in the document moving direction A1' in the explanation hereinafter.

The specific construction of the document reading unit 2 and the document end detecting unit 1 is as described below. In the example shown by FIGS. 1 to 3, the light-receiving section 23 is securely positioned, and the moving system 12 is constructed so as to move the document D. In this case, it is preferable that the back member 21 is a roller which is rotatable about a rotation axis and the document moving direction A1 is orthogonal to an axial direction A2 of the rotation axis of the back member 21. In FIG. 2, a movement path L2 of a document is shown by a phantom line.

The document end detecting unit 1 comprises, other than the elements described above, a housing 51 and a rod lens array 52. The light source 22, the light-receiving section 23, the rod lens array 52 and the housing 51 compose a contact image sensor (CIS) 54. The housing 51 holds the light source 22, the light-receiving section 23 and the rod lens array 52. A hollow inside the housing 51 is hermetically sealed. The reason for hermetically sealing the housing 51 is as follows. If dust enters the inside of the housing 51, the dust blocks a light path and a black line or the like appears on an image whose data are formed based on an output from the light-receiving section 23, with the result that the image will have fatal image quality deficiencies. In order to avoid such an influence of dust, the housing 51 is hermetically sealed to prevent dust from entering. One portion 53 of the housing 51 on a side facing the back member 21 is constructed as a reading surface in the CIS 54 so as to be capable of transmitting light. For example, the one portion 53 of the housing 51 on a side facing the back member 21 is made of a glass board.

The rod lens array 52 is composed of a plurality of optical fibers which are arranged in a row so as to be parallel to the main scanning direction A2. The rod lens array 52 is placed between the back member 21 and the light-receiving section 23. The light source 22 is made by an LED array or an EL (electroluminescence) element. An LED array is composed of a plurality of light-emitting diodes (LED) which are arranged in a row so as to be parallel to the main scanning direction A2. An EL element is placed so that the longitudinal direction of an EL light-emitting layer becomes parallel to the main scanning direction A2.

The moving system 12 of the document reading unit 2 includes a setting base 61, a document separating unit 62, an upstream guide member 64, a driving system 65 of the back member 21, a downstream guide member 66 and a hopper guide 68. The setting base 61, the hopper guide 68, the document separating unit 62, the upstream guide member 64 and the downstream guide member 66 are placed in this order from the upstream side to the downstream side on the movement path L2 of a document. The reference position PR locates between the upstream guide member 64 and the downstream guide member 66 on the movement path L2 of a document, and the back member 21 and the CIS 54 face each other across the document movement path L2 at the reference position PR. The document separating unit 62 includes a paper-feed roller 62a, a separating rubber 62b opposed to the paper-feed roller 62a and a separation stopper 62c which presses the separating rubber 62b against the paper-feed roller 62a.

A document is set on the setting base 61. A plurality of documents on the setting base 61 are guided between the paper-feed roller 62a and the separating rubber 62b by the hopper guide 68. The paper-feed roller 62a is provided with rotation for moving documents, whereby documents are separated one by one in the document separating unit 62. The separated documents are moved to the downstream side on the document movement path L2 by the paper-feed roller 62a, and guided by the upstream guide member 64 so as to pass between the back member 21 and the CIS 54. The driving system 65 supplies rotation for moving documents to the back member 21, whereby the back member 21 moves the documents between the back member 21 and the CIS 54 to the downstream side in the document moving direction A1 while causing the documents to pass through the reference position PR. The documents having passed through the reference position are guided outside the facsimile apparatus 3 by the downstream guide member 66. The driving system 65 may drive not only the back member 21 but also the paper-feed roller 62a. In the example shown in FIG. 2, the paper-feed roller 62a and the back member 21 also work as rollers for transferring documents, so that a component count of the document reading unit 2 is decreased. Other than the above construction, the moving system 12 may be equipped with at least either a pair of rollers 63 for transferring documents or a pair of rollers 67 for ejecting documents as shown in FIG. 3.

Documents pass between the back member 21 and the CIS 54 with surfaces to be read facing the CIS 54. The rod lens array 52 gathers light reflected from the back member 21 or a document passing through the reference position PR, and forms an image on the light-receiving section 23. The respective light-receiving elements 26 subject the received light to optoelectronic conversion, and output electric signals corresponding to the amounts of received light. Data obtained by analog/digital converting the electric signals from the light-receiving elements 26 become data of the reflected light amounts from the light-receiving elements 26. As a result, the CIS 54 is capable of reading a region of one line in the main scanning direction of a document at a time. A region of one line in the main scanning direction of the document D is one portion located at the reference position PR within the surface of the document. By sequentially reading a region of one line in the main scanning direction while the document passes through the reference position PR, the entire surface facing the CIS 54 of the document is read.

As explained above, the document end detecting unit 1 detects a shade appearing at the back member 21 due to an end of a document, and detects a document end based on a result of detecting the shade. This enables the document end detecting unit 1, in the case where the light source 22 illuminates a document from the upstream side in the document moving direction, to optically detect a position of a downstream end in the moving direction of the document which changes as the document moves, based on the shade. Further, in the case where the light source 22 illuminates a document from the downstream side in the document moving direction, the document end detecting unit is capable of optically detecting a position of an upstream end in the moving direction of the document which changes as the document moves, based on the shade. Therefore, the document end detecting unit 1 is capable of detecting either end of a document without contacting.

Further, in the document end detecting unit 1, a shade appearing at the slot 41 of the back member 21 is used for detecting a document end. The reason for this is as follows. When practically used, the document end detecting unit 1 needs to detect an end of not only a document having a reference thickness which is previously defined but also a document having any thickness in a wide range of thickness regardless of the reference thickness. The smaller the thickness of a document is, the harder a shade of a document end appears. Therefore in the case where the back member 21 does not have the slot 41, the smaller the thickness of a document is, the harder the document end detecting unit 1 detects a document end. In the case where the back member 21 does not have the slot 41, reliability of the document end detecting unit 1 which is required when used as a front-end sensor of the document reading unit 2 cannot be ensured sufficiently. When the thickness of a document is the same, a shade caused by a document end appears more clearly at the slot 41 of the back member 21 than at a portion other than the slot 41 of the back member 21, so that detection of a shade appearing at the slot 41 of the back member 21 makes it possible to reliably detect appearance and disappearance of a shade. Therefore, the detecting section 24 is capable of detecting a document front-end more reliably by detecting a document front-end based on a change over time of the amount of light reflected from the slot 41, than detecting a document front-end based on a change over time of the amount of light reflected from a portion other than the slot 41 of the surface of the back member 21, whereby the precision in detection is increased.

In the case of thus detecting a document end by using a shade appearing at the slot 41 of the back member 21, it is possible to reliably detect a document end regardless of the thickness of a document, so that it is possible to sufficiently ensure reliability of the document end detecting unit 1 which is required when used as a front-end sensor of the document reading unit 2. The document end detecting unit 1 of this embodiment which detects a document end by using a shade appearing at the slot 41 of the back member 21, as compared with a conventional document end detecting unit which uses the back member 21 having no slot 41, enhances reliability in detection of a document end so as to be practicable enough.

Further, as mentioned above, the document reading unit 2 uses the document end detecting unit 1 which uses a shade caused by a document end in order to control start or finish of data accumulation. Outputs from the light-receiving section 23 of the document end detecting unit 1 are accumulated as data of an image of a result of reading a document, so that a light-receiving element 26 used for detecting a document end can also work as a light-receiving element 26 for optically reading a document. This minimizes an error in detection of a document end due to movement of a document. Moreover, since the light-receiving element 26 for detecting a document end also works as the light-receiving element 26 for reading a document, a component count of the document reading unit 2 is decreased. Since the document end detecting unit 1 reliably detects a document end by using the back member 21 having the slot 41, the accumulation control section 31 can accurately control start or finish of data accumulation. The facsimile apparatus 3 equipped with such a document reading unit 2 as explained above is capable of precisely executing a process associated with detection of a document end because the precision in detection of a document end is increased.

In the document end detecting unit 1, it is preferable that the back member 21 has a plurality of slots 41 and the detecting section 24 performs detection of a shade of a document front-end and detection of a position of a document front-end at the plurality of slots 41 on the surface of the back member 21, respectively. As a result, a plurality of results of detecting a position of a document front-end, so that by using the detection results, it is possible to increase the precision in a position of a front-end and detect a skew of a document. In the case of detecting a document end at a plurality of points, it is possible to more accurately detect a document front-end even when the thickness of a document is small and a shade of a document front-end appearing on the surface of the back member 21 is thin, for example. In the case where a document end is detected at a plurality of points, the detecting section 24 may judge that a document front-end is detected when a shade of a document end is detected at one point at least, for example. This allows a front-end to be surely detected even when the width of a document in the main scanning direction A2 is smaller than the width of the light-receiving section 23 in the main scanning direction A2. Moreover, in the case where a document end is detected at the respective slots 41 on the surface of the back member 21, it is possible to increase the precision in a position of a document end and detect a skew of a document, so that it is possible to increase the precision in reading a document and increase the quality of an image of a result of reading in the document reading unit 2.

In the case where the light source 22 and the light-receiving elements are fixed and a document moves, the document end detecting unit 1 can be downsized. In the case of a construction that the light source 22 and the light-receiving elements are fixed and a document moves, it is preferable that the back member 21 is a roller. In the case where the back member 21 is a roller, the back member 21 can work as one of the members of the document moving system, so that the document reading unit 2 can be downsized and a component count of the document reading unit 2 can be decreased. Therefore, the production cost of the document reading unit 2 is reduced.

It is preferable that the surface of the back member 21 is made of a material which is white or light-color close to white. As a result, in the case where the width of a document in the main scanning direction A2 is less than the width of arrangement of all the light-receiving elements 26 of the light-receiving section 23, light-receiving elements 26 which do not face the document receive light reflected from the white surface of the back member 21. Therefore, margins which are around a portion where a document is seen in an image of a result of reading become white. Therefore, in the case where the background color of a document is white, the color of margins coincides with the background color of a portion where a document is seen. Moreover, in the case where the surface of the back member 21 is made of a material which is white or light-color close to white, it is possible to produce a reference waveform for shading correction based on the amount of light reflected from the surface of the back member 21. A reference waveform, which is a waveform to become a reference when judging the density of pixels of an image based on the amount of light reflected from a document, indicates the so-called reference intensity for shading correction.

The slots 41 of the back member 21 may be disposed on the surface of the back member 21 at any positions that when a document with the minimum width to be processed by the document reading unit 2 passes through the reference position PR, the document surely passes between at least one of the slots 41 and the light-receiving section 23. The slot 41 may have any width that a thin document do not enter the slot, for example, a width of not less than 1 mm and not more than 10 mm. The slot 41 may have any depth that the light-receiving section 23 can reliably recognize a shade of a document front-end appearing at the slot 41, for example, a depth of not less than 0.2 mm and not more than 1 mm. FIG. 1 shows an example that the back member 21 has three slots 41.

Figure 4:
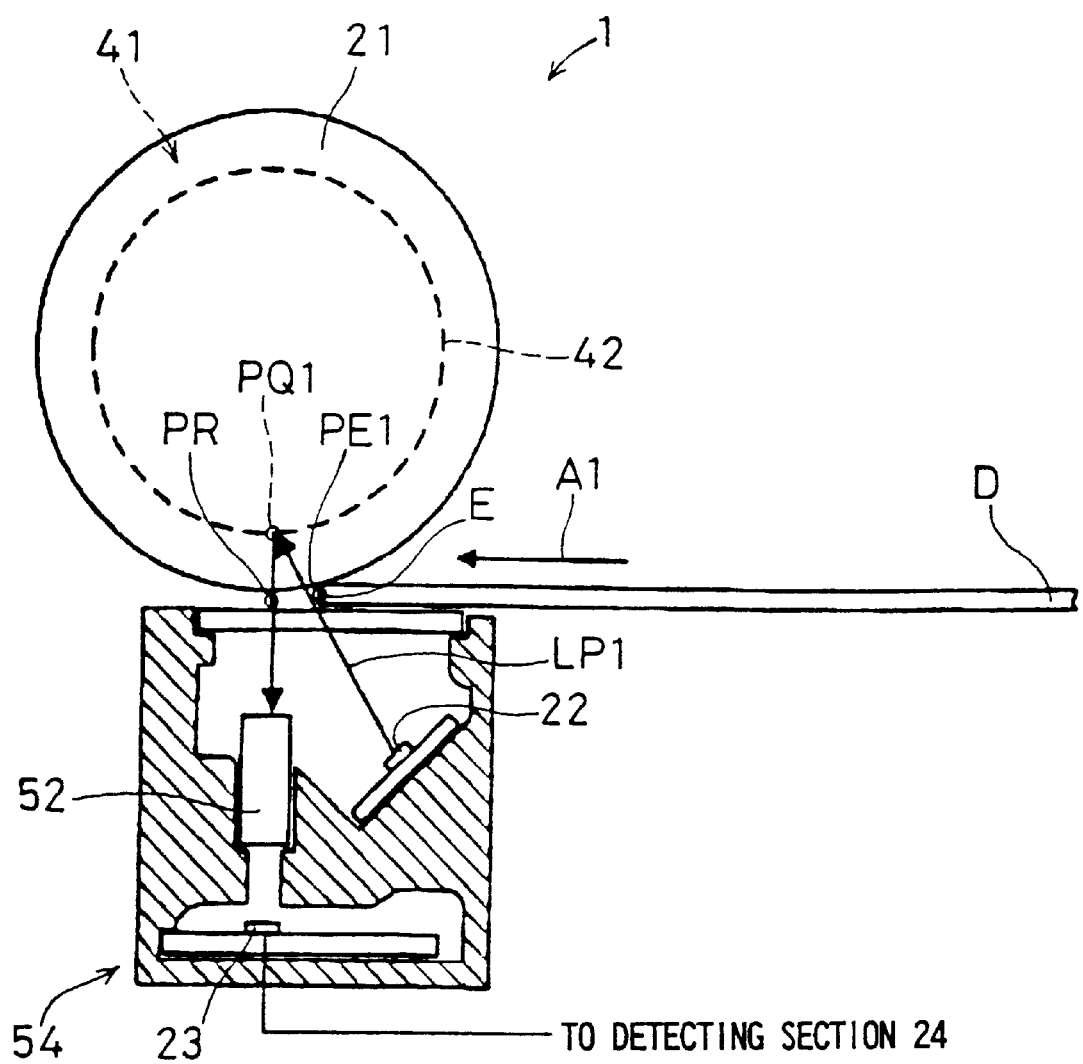
FIG. 4 is a side view schematically showing a construction of a back member 21 and a CIS 54 of the document end detecting unit 1 at a point in time that a shade of a front-end E of a document D appears at a slot 41.
Figure 5:
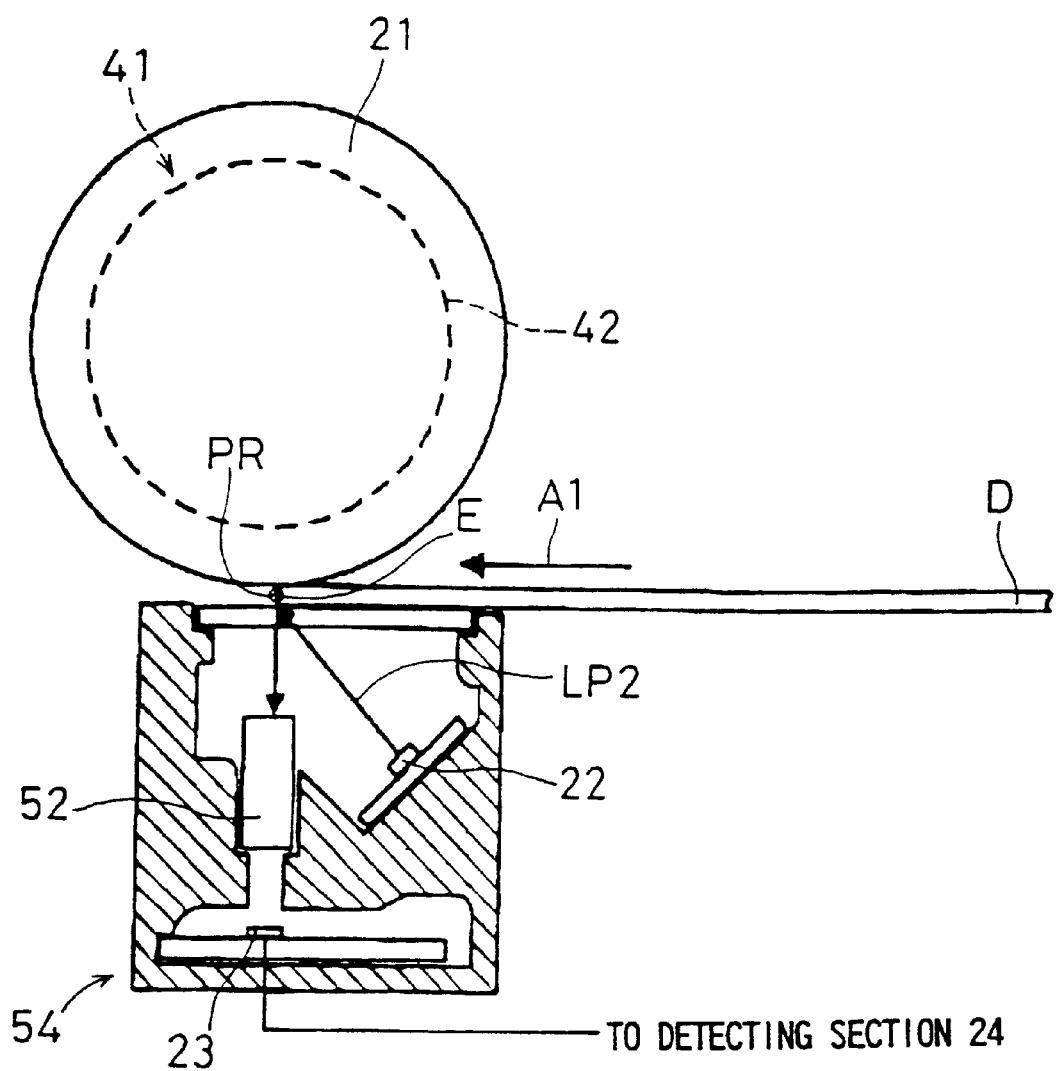
FIG. 5 is a side view schematically showing a construction of the back member 21 and the CIS 54 of the document end detecting unit 1 at a point in time that a shade of the front-end E of the document D disappears.

FIG. 4 and FIG. 5 are side views schematically showing a construction of the back member 21 and the CIS 54 of the document end detecting unit 1. FIG. 4 shows a state at a point in time when a shade of a front-end E of a document D appears at the slot 41, and FIG. 5 shows a state at a point in time when a shade of the front-end E of the document D disappears. In FIG. 4 and FIG. 5, a side surface of the CIS 54 is cut off. Referring to FIG. 4 and FIG. 5, a principle of a method of detecting the document front-end E based on a shade of the document front-end E will be explained.

In the case where the light source 22 locates on the upstream side in the document moving direction A1 from the reference position PR, a shade caused by the document front-end E is easy to appear on the back member 21. This can be explained by the following reason. When the front-end E of the document D comes close to the reference position PR, a portion right after an end surface of the document front-end E blocks a light path from the light-source 22 to the back member 21, so that light from the light source 22 cannot reach the back member 21. This decreases the amount of light reflected from the back member 21 to the light-receiving section 23 and makes the amount of light insufficient, so that a shade of the document front-end E appears on the back member 21. The larger the thickness of the document D is, the earlier and longer the light path is blocked, so that a shade of the document front-end E is easy to appear.

FIG. 4 shows a position of the document D at a point in time when a shade of the document front-end E appears at the slot 41. A position PE1 of the document front-end E when a shade appears locates on the upstream side in the document moving direction A1 from the reference position PR. Light which passes in a first light path LP1 shown in FIG. 4, in the case where an object to block the first light path LP1 does not exist, reaches a point PQ1 on a bottom surface 42 of the slot 41 of the back member 21 from the light source 22 and enters the rod lens array 52 after being reflected at the point PQ1 to form an image on the light-receiving section 23. When a shade appears, the first light path LP1 of all the light paths from the light source 22 is blocked by a portion right after an end surface of the front-end E of the document D. As a result, a shade appears at the slot 41, and the light-receiving section 23 outputs data of the reflected light amount corresponding to a dark color.

FIG. 5 shows a position of the document D at a point in time when a shade of the document front-end E disappears. The document front-end E when a shade disappears has reached the reference position PR. Light which passes in a second light path LP2 shown in FIG. 5, in the case where an object to block the second light path LP2 does not exist and an object exists at the reference position PR, reaches the surface of the object at the reference position PR from the light source 22 and enters the rod lens array 52 after being reflected at the surface of the object to form an image on the light-receiving section 23. When a shade disappears, the document front-end E has reached the reference position PR, so that the light from the light source 22 passing in the second light path LP2 reaches the light-receiving section 23. As a result, the light-receiving section 23 starts to receive light reflected from the surface of the document D instead of light reflected from the bottom surface 42 of the slot of the back member 21, so that the bottom surface 42 of the slot would not be read thereafter. Then, the shade disappears.

In this manner, while a position of the document front-end E moves from the position PE1 shown in FIG. 4 to the reference position PR shown in FIG. 5, the amount of light reflected from the bottom surface 42 of the slot becomes less than the reflected light amount in the case where the document D does not exist between the two positions PE1 and PR, so that a shade of the document front-end E appearing on the bottom surface 42 of the slot is read by the light-receiving section 23. Therefore, appearance/disappearance of a shade of the document front-end E and a position of the document front-end E have a relation, so that it is possible to detect a position of the document front-end E based on an appearance/disappearance timing of a shade of the document front-end E.

To be more accurate, timing when a shade of the document front-end E disappears when seen from the light-receiving section 23 coincides with timing when light reflected from the document front-end E reaches the light-receiving section 23, that is, timing when the document front-end E reaches the reference position PR. It is preferable that the detecting section 24 of the document end detecting unit 1 detects appearance and disappearance of a shade of the document front-end E based on outputs of the light-receiving section 23, and regards disappearance timing that a shade of the document front-end is detected as timing when the front-end reaches the reference position PR. This enables the document end detecting unit 1 to detect a front-end of a document with more reliability based on a shade appearing at the slot 41 of the back member 21.

In the case where the background color of a document is the same as the one of the surface of the back member 21 and different from the one of a shade, the detecting section 24 can detect the document front-end E based on the shade of the document front-end E as mentioned above. In the case where the background color of a document is almost the same as the one of a shade, that is, the background color is black or dark color, a change over time of data of reflected light amount from the light-receiving elements 26 becomes small, so that it is difficult to distinguish the shade from the document. In the case where the background color of a document is almost the same as the one of a shade, the detecting section 24 regards a point in time that data of reflected light amount from the light-receiving elements 26 change from data in the case of receiving light reflected from the surface of the back member 21 to data in the case of receiving light reflected from a dark-color portion of the document, as a point in time that the document front-end reaches the reference position PR and reception of light reflected from the document front-end is started. In this case, the detecting section 24 uses, instead of data of reflected light amount from light-receiving elements 26 opposed to the slots 41, data of reflected light amount from light-receiving elements 26 opposed to a dark-color document judging region on the surface of the back member 21. The dark-color document judging region is a portion of the surface without the slot 41 of the back member 21. This enables the document end detecting unit 1 to detect the document front-end not only in the case where the background color of a document is white but also in the case where the background color of a document is dark color.

In the case where the surface of a document is dark color, a change over time of the amount of light reflected from a portion without the slot 41 of the surface of the back member 21 is used for detection of a document end. Also at the portion without the slot of the back member, it is probable that a shade of a document front-end appears. The dark-color document judging region has no slots, so that a shade of a document front-end appearing in the dark-color document judging region is shorter than a shade of a document front-end appearing at the slot 41, and timing when the amount of light reflected from the dark-color document judging region is reduced to the amount corresponding to black due to the shade is closer to timing when the document end actually reaches the reference position PR than timing when the amount of light reflected from the slot 41 is reduced to the amount corresponding to black due to the shade. Therefore, in the case of regarding timing when the reflected light amount is reduced from the amount corresponding to the color of the surface of the back member to the amount corresponding to dark color, as timing when a document end reaches the reference position PR, a departure between a detected timing that a document end reaches the reference position and timing when the document end actually reaches the reference position becomes smaller when using reduction of the reflected light amount at the portion without the slot 41 of the surface of the back member 21 for detecting a document end, than using reduction of reflected light amount at the slot 41 of the back member 21 for detecting a document end. This can prevent decrease of the precision in detecting a document end even in the case of regarding decrease of the reflected light amount as timing when a document end reaches the reference position PR.

In the case where the surface of a document is dark color, it is preferable that a shade appearing on the surface other than the slot 41 of the back member 21 is detected after a shade 41 of a document end appearing at the slot 41 is detected. This makes it possible to reliably detect appearance of a shade even when the thickness of a document is smaller than a reference thickness and a shade is hard to appear, so that decrease of the precision in detecting a document end can be reduced still more. Further, in the case of regarding timing when the reflected light amount decreases as timing when a document end reaches the reference position PR, it is probable that an image of a result of reading contains a shade of a document front-end. When the surface of the document is dark color, it is difficult to distinguish the shade from the surface of the document in the image, so that the shade of the document front-end produces little visual adverse affects on the image. Therefore, when the surface of a document is dark color, regarding timing when the reflected light amount decreases as timing when a document end reaches the reference position PR does not produce any adverse effects on the quality of an image, and hence there is no problem.

Figure 6:
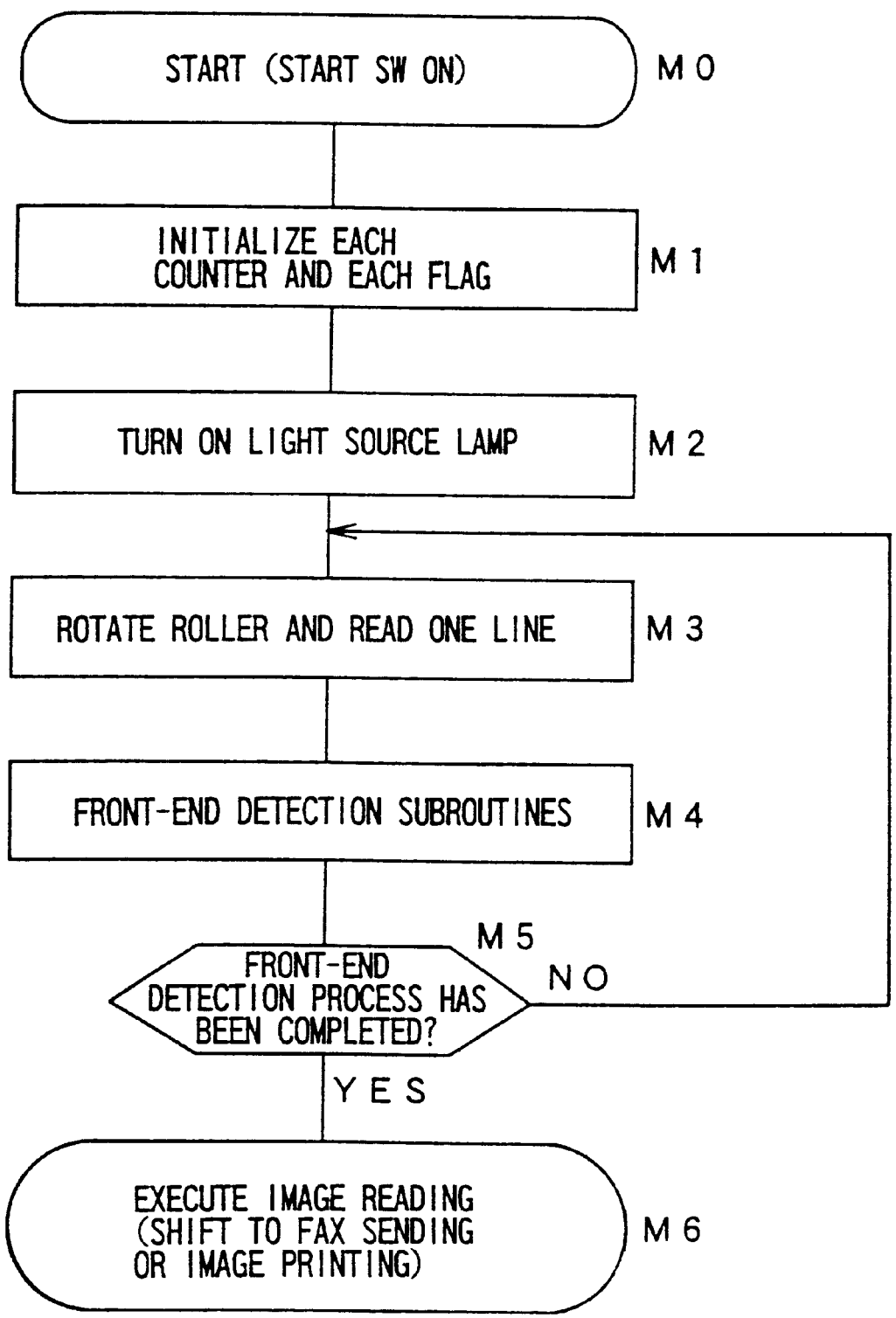
FIG. 6 is a flow chart for explaining a reading start process in the document reading unit 2.

FIG. 6 is a flow chart for explaining a reading start process in the document reading unit 2. In the example shown in FIG. 6, a reference waveform for shading correction has already been produced and stored in a storing section for storing a reference waveform disposed in the document reading unit 2. Therefore, in the case where the back member 21 is white, the document reading unit 2 may subject data from the light-receiving section 23 to shading correction prior to the reading start process under circumstances without influence on a document and a shade of an end of the document, and the data accumulation section 13 storing the correction result in a work memory disposed in the document reading unit may also work as at least one of the storing section for storing a reference waveform and the work memory.

When a start switch disposed to the document reading unit 2 is manipulated, the operation goes from step M0 to step M1. At step M1, the control section 11 initializes all counters and all flags used in a document reading process. At step M2, the control section 11 turns on the light source 22 in the turned-off state.

At step M3, the control section 11 causes the back member 21 to make a predetermined amount of angular displacement, and causes the light-receiving section 23 to receive light reflected from the reference position. As a result, each light-receiving element 26 of the light-receiving section 23 outputs data of the reflected light amount. Data of the reflected light amount from all the light-receiving elements 26 correspond to data of one line in the main scanning direction of an image.

At step M4, the detecting section 24 performs a process for detecting a document front-end based on front-end detection subroutines. The front-end detection subroutines will be illustrated later. At step M5, the control section 11 judges whether or not the detecting section 24 has completed the process for detecting a document front-end. In the case where a document front-end has not been detected yet, the operation goes back from step M5 to step M3. The processes at steps M3 to M5 are repeated until a document front-end is detected. When a document front-end is detected, the operation goes to step M6 to finish the reading start process and shift to the document reading process.

In the document reading process, reading of a region of one line of a document and shading correction are periodically repeated. In other words, periodically, the back member 21 is caused to make a predetermined amount of angular displacement as well as the light-receiving section 23 is caused to receive light reflected from the reference position, and data of the reflected light amount thereby outputted from each light-receiving element 26 are subjected to shading correction using a reference waveform. After the accumulation control section 31 gives a direction to start accumulation of data based on a detected timing that the detected document front-end reaches the reference position, data of the reflected light amount having been subjected to shading correction are accumulated in the data accumulation section 13. After the accumulation control section 31 gives a direction to start accumulation of data, the data of the reflected light amount having been subjected to shading correction are given to the communication unit 6 and used for a Fax sending process. Further, after the direction to start accumulation of data, data of the reflected light amount having been subjected to shading correction may be given to the printing unit 8 and used for an image printing process.

Figure 7:
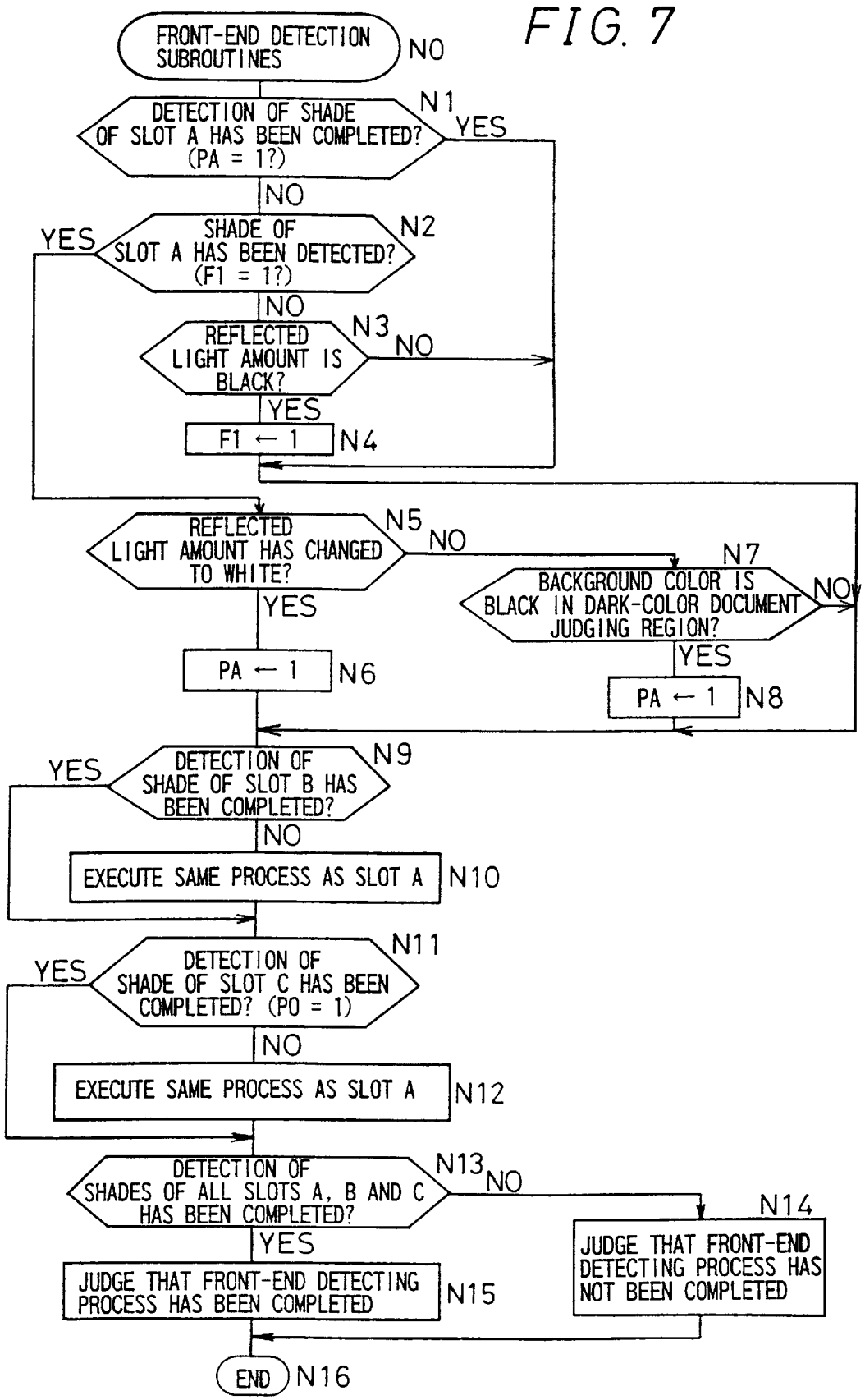
FIG. 7 is a flow chart of front-end detection subroutines performed at step M4 of the reading start process in FIG. 6.
Figure 8:
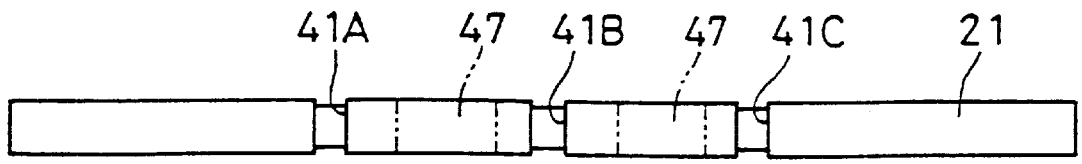
FIG. 8 is a front view of the back member 21 for explaining a placement state of the slot 41 and a dark-color document judging region 47.

FIG. 7 is a flow chart of front-end detection subroutines performed at step M4 of the reading start process shown in FIG. 6. In the example shown in FIG. 7, as shown in FIG. 8, the back member 21 with a white surface is provided with three slots 41A, 41B, 41C, and a point in time that disappearance of a shade of a document front-end is detected at all the slots is regarded as timing when the document front-end reaches the reference position. Further, in the example of FIG. 7, a shade of a document end does not appear on the surface of the back member 21 other than the slots 41. When the operation goes from step M3 to step M4 in the flow chart of FIG. 6, the operation goes from step N0 to step N1.

At step N1, the detecting section 24 judges whether a shade detection process at the first slot 41A has been completed or not. For judgement of completion of the shade detection process at the first slot 41A, a first completion flag PA is prepared. The first completion flag PA is reset to 0 in the state of being initialized, and set to 1 when the shade detection process at the first flag 41A is completed. When the first completion flag PA is 1, that is, when the shade detection process at the first slot 41A has been completed, the operation goes from step N1 to step N9. When the first completion flag PA is 0, that is, when the shade detection process at the first slot 41A has not been completed, the operation goes from step N1 to step N2, and a shade detection process at the first slot 41a at steps N2 to N8 is started.

At step N2, the detecting section 24 judges whether or not appearance of a shade of a document front-end is detected at the first slot 41A. In order to judge detection of appearance of a shade of a document front-end at the first slot 41A, a first detection flag F1 is prepared. The first detection flag F1 is reset to 0 in the state of being initialized, and set to 1 when appearance of a shade of a document front-end is detected at the first slot 41A. When the first detection flag F1 is 1, that is, when appearance of a shade has been detected at the first slot 41A, the operation goes from step N2 to step N5. When the first detection flag F1 is 0, that is, when appearance of a shade has not been detected at the first slot 41A, the operation goes from step N2 to step N3.

At step N3, the detecting section 24 judges whether or not the reflected light amount shown by data outputted from light-receiving elements 26 which receive light reflected from the first slot 41A is the amount corresponding to black.

In the case where the reflected light amount is the amount corresponding to black, the light-receiving elements 26 are receiving light reflected from a shade of a document front-end appearing at the slot 41 of the back member 21. In the case where the reflected light amount is more than the amount corresponding to black, a document front-end has not reached the reference position PR yet and the light-receiving elements 26 are receiving light reflected from the slot 41 of the back member 21. In the case where the reflected light amount is equal to or more than a threshold value which is the amount corresponding to black, the shade detection process at the first slot is finished, and the operation goes from step N3 to step N9. In the case where the reflected light amount is less than the threshold value which is the amount corresponding to black, the operation goes from step N3 to step N4. At step N4, the detecting section 24 sets the first detection flag F1 to 1. After the flag is set, the shade detection process at the first slot is finished, and the operation goes to step N9.

In the case where appearance of a shade of a document front-end has been already detected, at step N5 following to N2, the detecting section 24 judges whether or not the reflected light amount shown by data outputted from the light-receiving elements 26 which receive light reflected from the first slot 41A has changed from the amount corresponding to black to the amount corresponding to white during a time between the preceding detection and the recent detection. In the case where the recent reflected light amount is the amount corresponding to white, the reflected light amount has changed from the amount corresponding to black to the amount corresponding to white. In the case where the reflected light amount has changed from the amount corresponding to black to the amount corresponding to white, the operation goes from step N5 to step N6. In the case where the reflected light amount remains the amount corresponding to black, the operation goes from step N5 to step N7. At step N6, the detecting section 24 sets the first completion flag PA to 1. After the flag is set, the shade detection process at the first slot is finished, and the operation goes to step N9.

At step N7, the detecting section 24 judges whether the background color of a document is dark color or not based on data of the reflected light amount outputted from light-receiving elements 26 which receive light reflected from the dark-color document judging region 47 shown in FIG. 8. Therefore, the detecting section 24 judges whether or not the reflected light amount shown by data outputted from the light-receiving elements 26 which receive light reflected from the dark-color document judging region 47 has become the amount corresponding to dark color. The front-end detection subroutines shown in FIG. 7 are constructed on the assumption that when the reflected light amount shown by data outputted from the light-receiving elements 26 which receive light reflected from the dark-color document judging region 47 becomes the amount corresponding to dark color is limited to when the light-receiving elements 26 read a document whose background color is dark-color. In the case where the background color of a document is dark-color, the operation goes from step N7 to step N8. In the case where the background color of a document is brighter than dark-color, the shade detection process at the first slot is finished, and the operation goes from step N7 to step N9. At step N8, the detecting section 24 sets the first completion flag PA to 1. After the flag is set, the shade detection process at the first slot is finished, and the operation goes to step N9.

At step N9, the detecting section 24 judges whether a shade detection process at the second slot 41B has been completed or not. In the case where the shade detection process at the second slot 41B has been completed, the operation goes from step N9 to step N11. In the case where the shade detection process at the second slot 41B has not been completed, the operation goes from step N9 to step N10, and a shade detection process at the second slot 41B at step N10 is started. The judging process at step N9 is executed by using a second completion flag PB in the same manner as the process at step N1. The shade detection process at the second slot 41B at step N10 is executed by using the second completion flag PB, a second detection flag F2 and light-receiving elements 26 which receive light reflected from the second slot 41B in the same manner as the process at steps N2 to N8. After the process at step N10 is finished, the At step N11, the detecting section 24 judges whether a shade detection process at the third slot 41C has been completed or not. In the case where the shade detection process at the third slot 41C has been completed, the operation goes from step N11 to step N13. In the case where the shade detection process at the third slot 41C has not been completed, the operation goes from step N11 to step N12, and a shade detection process at the third slot 41C at step N12 is started. The judging process at step N11 is executed by using a third completion flag PC in the same manner as the process at step N1. The shade detection process at the third slot 41C at step N12 is executed by using the third completion flag PC, a third detection flag F3 and light-receiving elements 26 which receive light reflected from the third slot 41C in the same manner as executed at steps N2 to N8. After the process at step N12 is finished, the operation goes to step N13.

At step N13, the detecting section 24 judges whether or not the shade detection processes have been completed at all the slots 41A, 41B, 41C. In the case where disappearance of a shade has not been detected at all the slots 41A, 41B, 41C, the operation goes from step N13 to step N14, and the detecting section 24 judges that the process of detecting a front-end of a document has not been completed and returns the judgement result to the control section 11. In the case where disappearance of a shade has been detected at all the slots 41A, 41B, 41C, the operation goes from step N13 to step N15, and the detecting section 24 judges that the process of detecting a front-end of a document has been completed and returns the judgement result to the control section 11. Timing when the process of detecting a front-end of a document is completed is regarded as timing when the document front-end reaches the reference position. After the judgement result is returned at steps N14, N15, the front-end detection subroutines are finished at step N16, and the operation shifts to step M5 in FIG. 6.

In the front-end detection subroutines of FIG. 7, it is assumed that a shade of a document front-end does not appear on the surface of the back member 21 other than the slots 41. Actually, it is probable that a shade of a document front-end also appears on the surface of the back member 21 other than the slots 41 in the case where the thickness of the document is comparably large, for example. Regardless of whether the background color of a document is white or black, in order to avoid misjudging that the background color of the document is dark color due to a shade of a document front-end, it is preferable to execute only a judgement of a change of the reflected light amount at step N5 and stop a judgement associated with the dark-color document judging region at step N7, while the shade detection process at steps N2 to N8 is repeated a predetermined number of times from the next time to a time that the detection flag F1 is set to 1, that is, the next time to a time that a shade of the slot is detected. For this, in the front-end detection subroutines, a step of counting the number of times of judgement at step N5 after the detection flag F1 is set and a step of judging whether or not the counted number of times of judgement is equal to or more than a reference number of times are interposed between step N5 and step N7, and the operation is shifted to step N7 only when the counted number of times of judgement becomes equal to or more than the reference number of times. The reference number of times of executing only the judgement at step N5 is, for example, not less than one and not more than nine. It can be considered to be reasonable that the reference number of times is, when defined in view of a distance, a number of times that a shade detection process is repeated within a time required for a document front-end to travel about 1 mm.

As explained with reference to FIGS. 4 and 5, a shade of a document front-end is shorter enough than the length of the document, so that a distance between a position of a document when a shade appears and a position of the document at a point in time that the document front-end reaches the reference position PR is shorter enough than the length of the document. Therefore, in the document end detecting unit 1, the detecting section 24 may regard timing when a predetermined time has elapsed after appearance timing of a shade of a document front-end as timing when the document front-end reaches the reference position PR, instead of regarding disappearance timing of a shade of a document front-end as timing when the document front-end reaches the reference position PR. In this case, the detecting section 24 detects only appearance timing of a shade of a document front-end and regards a point in time that a document relatively moves a predetermined distance from the detected appearance timing of the shade of the document front-end as timing when the document front-end reaches the reference position PR. For example, the control section 11 regards a point in time that the back member 21 is rotated by a predetermined movement distance of a document from a detected appearance timing of a shade of a document front-end as timing when the document front-end reaches the reference position, and starts accumulation of data from the point in time. In the case of thus detecting only appearance timing of a shade of a document front-end, a construction for detecting a shade of a document front-end is simplified, so that a construction of the entire document end detecting unit 1 is simplified. In this case, instead of executing the judgement of a change of the reflected light amount at step N5, it is judged whether or not the rotation amount of the back member 21 from a point in time that a shade of a document front-end is first detected at the slot becomes a predetermined amount, or whether or not an elapsed time from the point in time reaches a predetermined time. Furthermore, in the case of thus detecting timing when a document front-end reaches the reference position based on only appearance timing of a shade of a document front-end at the slot, it is preferred still more to omit the process at steps N7, N8 for detecting a front-end of a document whose background color is dark color. This further simplifies a construction for detecting a document end.

Shading correction in the document reading unit 2 will be illustrated below. Specifically, the shading correction section 32 corrects data of the reflected light amount from each light-receiving element 26 based on a ratio of an output waveform of the light-receiving section 23 to a predetermined reference waveform. The output waveform of the light-receiving section 23 corresponds to a graph which shows a relation between the reflected light amounts outputted from the light-receiving elements 26 and positions of the light-receiving elements 26. The reference waveform is produced by the reference waveform producing section 33 prior to shading correction. In the data accumulation section 13, corrected data of the reflected light amount are accumulated as data of the density of pixels composing an image. In this manner, the document reading unit 2 further comprises a shading correction section for correcting an output from the light-receiving section 23, so that it is possible to eliminate, from an image, an effect of variations in sensitivity of the plurality of light-receiving elements 26 of the light-receiving section 23.

The reference waveform producing section 33, basically, causes the light-receiving section 23 to receive light reflected from the surface of the back member 21 and stores an output waveform of the light-receiving section 23 which is thereby obtained as a reference waveform. This facilitates production of a reference waveform in consideration of variations in property of individual light-receiving section, so that the shading correction section 32 is capable of accurately performing shading correction in each unit.

Figure 9A:
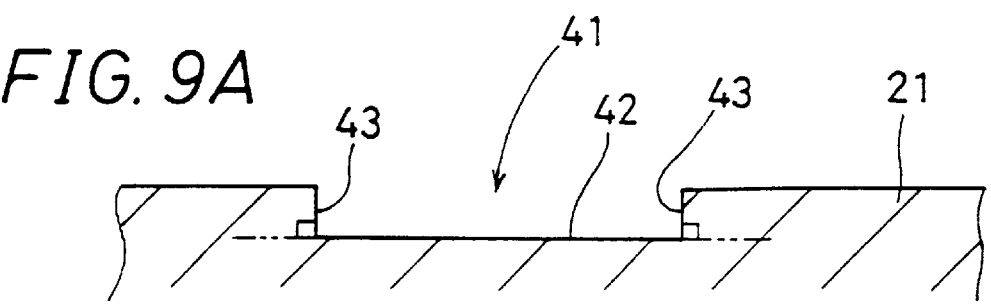
FIGS. 9A to 9C are partly enlarged section views of the back member 21 for explaining a section shape of the slot 41.

As mentioned before, on the surface of the back member 21, the slot 41 whose longitudinal direction is orthogonal to the document moving direction A1 is disposed. In the simplest shape, the slot 41 of the back member 21 is shaped so that side walls 43 of the slot 41 are perpendicular to the bottom surface 42 of the slot as shown in FIG. 9A. In the case where the shape of a section orthogonal to the longitudinal direction of the slot 41 is rectangular as shown in FIG. 9A, it is expected that dark portions appear around the slot side walls 43. This is because that a light-emitting element which is the light source 22 does not necessarily emit light uniformly in the main scanning direction A2 and hence light which should travel from the light source 22 to the slot bottom surface 42 is often blocked by the surface of the back member 21 in the vicinity of the slot side walls 43, whereby dark portions appear around the slot side walls 43. In specific, when a plurality of light-emitting diodes are arranged like an array in the case of an LED array or the like, a light path from the light source 22 is laterally inclined to the main scanning direction A2 in some places, so that dark portions are easy to appear.

Figure 9B:
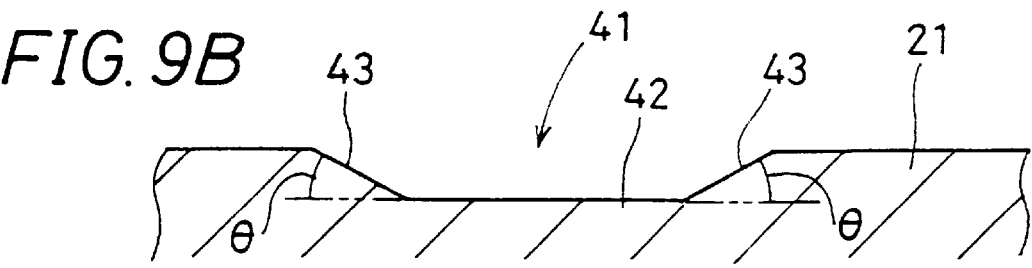

In order to prevent dark portions from appearing, it is preferable that the side walls 43 of the slot 41 have a gradient. That is to say, it is preferable that an inclination angle θ of the side walls of the slot 41 of the back member 21 to the bottom surface of the slot 41 is an angle of more than 0° and less than 90° as shown in FIG. 9B. By this, when illumination is laterally inclined to the main scanning direction in some places in the case of an LED array or the like, the bottom surface 42 and the side walls 43 of the slot 41 and a portion around the slot 41 on the surface of the back member 21 are sufficiently illuminated. As a result, the difference between the amount of light reflected from the slot 41 of the back member 21 and the amount of light reflected from a portion other than the slot 41 of the surface of the back member 21 is minimized, so that reflectivity of the surface of the back member 21 having the slot 41 becomes almost uniform in the main scanning direction A1.

Figure 9C:
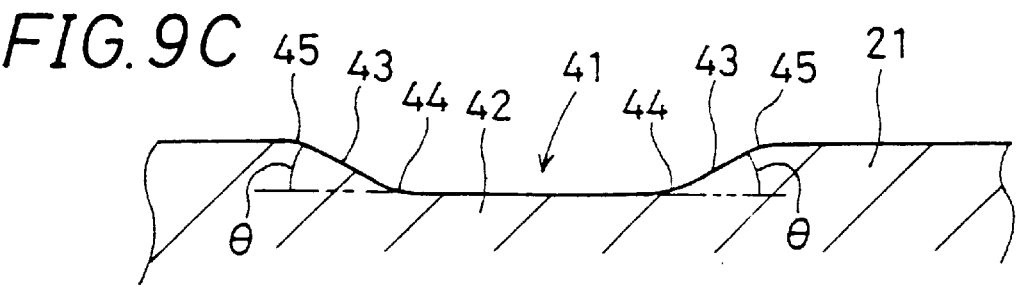

In order to prevent dark portions from appearing, it is further preferable that at least one of an angle corresponding to a border portion 44 between the slot bottom surface 42 and the slot side walls 43 and an angle corresponding to a border portion 45 between the slot side walls 43 and the surface of the back member 21 has a smooth curvature. That is to say, it is preferable that, as shown in FIG. 9C, at least one of the surface of the border portion 44 between the slot bottom surface 42 and the slot side walls 43 and the surface of the border portion 45 between the slot side walls 43 and the surface of the back member 21 is curved. It is still more preferable that the surfaces of both the two border portions 44, 45 are curved, and it is the most preferable that the border portions 44, 45 are curved as well as the slot side walls 43 have a gentle gradient.

It is preferable that the surfaces of the border portions 44, 45 are curved for the following reason. In the case where the surfaces of the border portions 44, 45 are sharply angled, an irregularity occurs in reflection of light on the surfaces of the border portions 44, 45, so that it is probable that a black or white line substantially parallel to an orthogonal direction to the main scanning direction A2 appears in an image which is a result of reading. The black line is a line darker than a portion around the line in an image, and the white line is a line brighter than a portion around the line in an image. Such a black or white line causes degradation of the quality of an image. In the case where the surfaces of the border portions 44, 45 are curved so that the border portions 44, 45 have a smooth curvature, diffuse reflection of light due to an angle between the slot side walls 43 and the slot bottom surface 42 and diffuse reflection of light due to an angle between the slot side walls 43 and the surface of the back member 21 are restricted, so that anomalous concentration or anomalous dispersion of light on the surfaces of the border portions 44, 45 can be prevented. As a result, light reflected from the surface of the back member 21 having the slot 41 becomes more uniform. In the case where the border portions 44, 45 are thus curved, the back member 21 having the slot 41 can be treated as a member with almost uniform reflectivity, so that the back member 21 can be used as a member for producing a reference waveform at shading correction, for example.

As explained above, in the document reading unit 2, in the case where the slot side walls 43 of the back member 21 have a gentle gradient, in the case where an angle of the portion 44 where the slot side wall 43 rises from the slot bottom surface 42 is gently curved, or in the case where an angle of the portion 45 where the slot 41 falls from the surface of the back member 21, the back member can be treated as a member with almost uniform reflectivity. Such a back member 21 can be used as a member for producing a reference waveform at shading correction, for example. In the case where the slot 41 has one of the shapes described above, an output waveform obtained by causing the light-receiving section 23 to receive light reflected from the back member 21 having the slot 41 becomes more appropriate as a reference waveform, so that the shading correction section is capable of performing shading correction with more accuracy.

In the case where the back member 21 has the slot 41, it is preferable that an output waveform from the light-receiving section 23 is corrected so as to eliminate an effect of the slot 41. In the document reading unit 2, shading correction and correction of a reference waveform are required for the following reason. The following explanation of correction takes a facsimile apparatus shown in FIG. 2 which has, instead of the CIS 54, a downsized reading section using a reflection mirror, a single lens and a small CCD sensor as well as a back member 21 having one slot 41, as an example. The CCD sensor is composed of a plurality of light-receiving elements arranged in a row in a main scanning direction D. FIG. 10 shows a standard output waveform G of the downsized reading section in the case of causing the downsized reading section to read the surface of the back member 21. The output waveform G corresponds to a graph of the output property of the downsized reading section. The X coordinates of the horizontal axis of FIG. 10 show positions of the respective light-receiving elements in the main scanning direction A2, that is, the X coordinates of the respective light-receiving elements on the X coordinate axis which is parallel to the main scanning direction. The vertical axis of FIG. 10 shows data of reflected light amount from the light-receiving element, that is, the amount of light received by the light-receiving element. The larger the amount of light is, the larger a value of reflected light amount data is.

In the downsized reading section, due to the property of the lens, as it is closer to the end of the row of the light-receiving elements arranged in the main scanning direction, the amount of light reaching the surfaces of the light-receiving elements becomes small. Therefore, even if reflectivity of the surface of the back member 21 is almost uniform in the main scanning direction, the output waveform G is like an arc as shown in FIG. 10. Further, in the case where there are variations in sensitivity of the light-receiving elements of the CCD sensor, even if reflectivity of the surface of the back member 21 is almost uniform in the main scanning direction, the output waveform G rises and falls in accordance with the variations in sensitivity. In this manner, the output waveform from the CCD sensor does not become uniform even in the case of reading a member with uniform reflectivity, due to the property of the lens and variations in sensitivity of the light-receiving elements. To obtain an accurate result of reading a document by using such a CCD sensor, an output waveform in the case of causing the CCD sensor to read a standard white member whose reflectivity is uniform in the main scanning direction is prepared as a standard reference waveform. When a document is actually read, an output waveform outputted by the CCD sensor after reception of light reflected from the document is compared with the reference waveform, and based on a ratio of the actual output waveform to the reference waveform, the actual output waveform is corrected. The value of a position corresponding to each light-receiving element in the corrected output waveform is used as the density of a pixel. Such a process is called as shading correction.

In the document reading unit 2 of this embodiment, the back member 21 is used as a standard white member for producing a reference waveform. As mentioned before, in the case where the back member 21 has the slot 41, data of the reflected light amount from a light-receiving element opposed to the slot 41 are less than data of the reflected light amount from the light-receiving element in the case where the back member 21 has no slot 41, so that a fall caused by the slot 41 appears in an output waveform G which is a result of reading the surface of the back member 21. The X coordinates X1, X2 of both ends of a falling portion 81 of the output waveform G which is a result of reading the surface of the back member 21 correspond to positions 26 of light-receiving elements opposed to both ends of the slot 41. The fall in the output waveform G due to the slot 41 of the back member 21 appears because: an irradiation angle of the light source 22 in the case of irradiating the surface of the back member 21 is different from an irradiation angle of the light source 22 in the case of irradiating the surface of the slot 41, so that there is a difference in brightness; and there is an influence of diffusion of light reflected from the slot 41 due to the side walls 43 of the slot 41. Since a reference waveform to become a reference for shading correction needs to be as accurate as possible, it is preferable to correct the fall caused by the slot 41.

Correction of a reference waveform is required in the case where the back member 21 has a slot and the density of pixels of an image outputted by the document reading unit 2 has a multiple value, whereas correction of a reference waveform is not required in the case where the back member 21 has no slot. Further, in the case where the light-receiving section 23 performs binary reading of an object, light reflected from the slot 41 is also judged to be white, so that correction of a reference waveform is not required. In the CIS 54 as shown in FIG. 1, reflected light is gathered by the small rod lens array 52, so that an output waveform of the CIS 54 has such a shape that the output waveform of the downsized reading unit is repeated at every arrangement cycle of the rod lens and a waveform at a light-receiving element opposed to the slot 41 of the back member 21 exhibits a fall.

For the reasons explained above, it is preferable that the reference waveform producing section 33 corrects the shape of an output waveform of the light-receiving section 23 at the time of receiving light reflected from the back member 21 to a shape in the case where the back member 21 has no slot, and stores the corrected output waveform as a reference waveform. A more accurate reference waveform is thereby produced. By using a corrected reference waveform for shading correction, it is possible to adopt such an ideal method as use the back member 21 having the slot 41 and make the light-receiving elements 26 work for both reading a document and detecting a document end, as well as it is possible to perform shading correction with more accuracy.

As a method of correcting a reference waveform in the case where the slot 41 is formed on the surface of the back member 21, there are two methods of a first correction method and a second correction method which will be explained below. In the first correction method, the reference waveform producing section 33 corrects the output waveform G which is a result of reading the surface of the back member 21 by interpolating the falling part 81 of the output waveform G corresponding to the slot 41 by the remainders 82, 83 of the output waveform G which are part other than the falling portion 81.

An interpolation method is to set a plurality of reference points from the remainders 82, 83 on both sides of the falling part 81 of the output waveform G, find an approximate graph passing through the plurality of reference points, and replace the falling part 81 of the output waveform G with part within a X coordinated range WX1 of the falling part 81 of the approximate graph. For example, correction is performed by setting three reference points 86 to 88 in both sides of the falling part 81 of the output waveform G, finding a quadratic equation of an approximate graph passing through the three reference points 86 to 88, and filling the falling part 81 of the output waveform G with the quadratic equation. Further, for example, correction is performed by setting four reference points 86 to 89, two in each of the sides of the falling part 81 of the output waveform G, finding a cubic equation of an approximate graph passing through the four reference points 86 to 89, and filling the falling part 81 of the output waveform G with the cubic equation.

The X coordinates of reference points on the output waveform G, that is, the positions of light-receiving elements 26 which output data of the reflected light amount used as reference points are predetermined. The light-receiving elements 26 of the reference points are selected from among light-receiving elements 26 which are not opposed to the slot 41 of all the light-receiving elements 26 of the light-receiving section 23, and selected so that at least one reference point is set on each of the sides of the falling part 81 of the output waveform G. For example, in the case where the width of the light-receiving section 23 in the main scanning direction is 216 mm and the arrangement cycle of the light-receiving elements 26 is 8/mm, the number of the light-receiving elements of one line is 1728. When it is known in advance where the slot 41 of the back member 21 locates in the main scanning direction, it is possible to know where a falling part appears in an output waveform, so that reference points are set avoiding a place where a falling part appears. Further, in the case where an output waveform is converted into digital data and stored in a temporary storage memory included in the document reading unit 2, it is also possible to check a position of a falling part of the output waveform based on the output waveform converted into digital data. In this case, after a position of a falling part is checked, reference points are set avoiding the checked falling part and the output waveform is corrected by using the set reference points.

As explained above, in the case where, at the time of correcting an output waveform, the part of the output waveform G corresponding to the slot 41 is interpolated by both the sides of the part of the output waveform G, it is possible to correct a reference waveform with ease and reliability by using only the output waveform. The first correction method is effective on a document reading unit wherein an output waveform of a result of reading the surface of the back member 21 is a substantially arc-shaped waveform as shown in FIG. 10, for example, a document reading unit which comprises a downsized light-receiving section as mentioned before. The value at a reference point on the output waveform G may be an output value of one light-receiving element at a position to become a reference point, or may be an average value of output values of two or more light-receiving elements within a predetermined range including a position to become a reference point. It is preferable to use an average value because variations in sensitivity of the light-receiving elements have less influence on correction of the output waveform G.

In the second correction method, the reference waveform producing section 33 produces a reference waveform by using a standard falling waveform and a standard reference waveform which are previously stored in the standard waveform storing section 14 and an output waveform G which is a result of actually reading the surface of the back member 21. The standard falling waveform corresponds to an output waveform of the light-receiving section 23 in the case of receiving light reflected from the back member 21 having a slot. The standard reference waveform corresponds to an output waveform of the light-receiving section 23 in the case of receiving light reflected from the back member 21 having no slot. The standard falling waveform and the standard reference waveform are design output waveforms, in which deviation of the position of a slot and variations in sensitivity of the light-receiving elements in an actual document reading unit are not considered. The standard waveform storing section 14 stores at least one standard reference waveform.

In the case where only one standard reference waveform is stored, the reference waveform producing section 33 first compares an actual output waveform G with a standard falling waveform, and corrects a position and size of a falling part due to the slot within the standard falling waveform so as to coincide with a position and size of a falling part 81 of the actual output waveform G. Then, based on the corrected standard falling waveform, the standard reference waveform is corrected. Then, based on the corrected standard falling waveform and the actual output waveform G, the change amount of variations in sensitivity of each of the plurality of light-receiving elements is found. The change amount of an arbitrary one light-receiving element is, for example, the difference between the value on the corrected standard falling waveform at the light-receiving element and the value on the actual output waveform G at the light-receiving element. Finally, the found change amount is filled into the corrected standard reference waveform.

In the case where a plurality of standard reference waveforms are stored, the reference waveform producing section 33 first compares an actual output waveform G with a standard falling waveform, and corrects a position and size of a falling part due to the slot within the standard falling waveform so as to coincide with a position and size of a falling part 81 of the actual output waveform G. Then, from among the plurality of standard reference waveforms, one standard reference waveform associated with the corrected reference falling waveform is selected. Then, based on the corrected standard falling waveform and the actual output waveform G, the change amount of variations in sensitivity of each of the plurality of light-receiving. elements is found. Finally, the found change amount is filled into the selected standard reference waveform.

In the case where a standard falling waveform and a standard reference waveform are thus prepared, it is the best way to first correct the standard falling waveform in consideration of a change of an actual position of a slot from a design position of the slot, then find variations in property of each light-receiving element based on the corrected standard falling waveform, and find the final reference waveform by tempering the found variations. As explained above, when there is the standard waveform storing section 14, the reference waveform producing section 33 corrects part of an output waveform from the light-receiving section 23, corresponding to the slot 41, based on a standard falling waveform and a standard reference waveform. This also makes it possible to reliably correct a reference waveform. The second correction method is effective on not only a document reading unit wherein an output waveform G of a result of reading the surface of the back member 21 is a substantially arc-shaped waveform as shown in FIG. 4, but also a document reading unit wherein the output waveform G has another shape, for example, a document reading unit which uses the CIS 54 having a rod lens array.

In the case of correcting a reference waveform in one of the two methods explained above, it is possible to produce a reference waveform with more accuracy even when the back member 21 has the slot 41. A process of producing a reference waveform is performed when a mode for producing a reference waveform is selected, for example. The produced reference waveform is stored in a storing section for storing a reference waveform included in the document reading unit 2, and when a document is read, the reference waveform stored in the storing section for storing a reference waveform is read out and used. Otherwise, the process of producing a reference waveform may be performed prior to reading a document every time when a document is read.

Figure 11A:
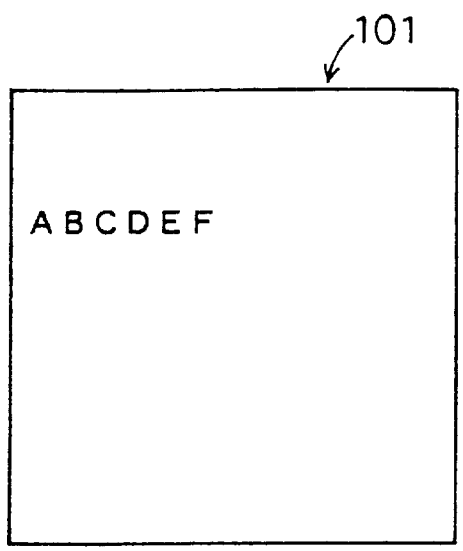
FIGS. 11A to 11D are views for explaining a shade elimination process for eliminating a back line caused by a shade of a document front-end from an image.
Figure 11B:
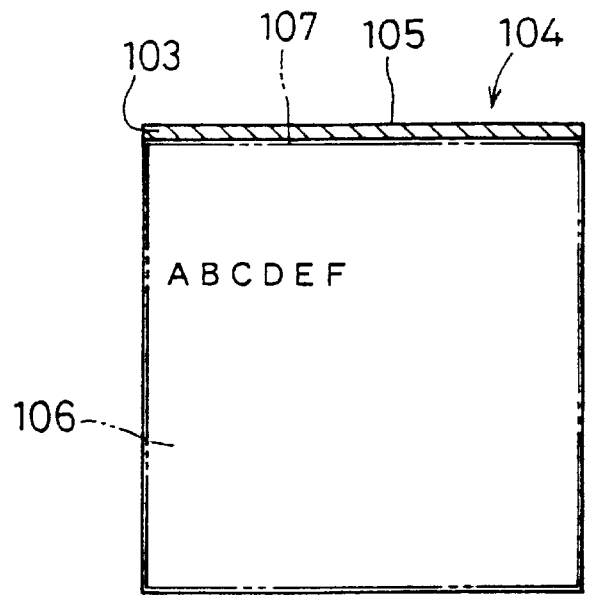
Figure 11C:
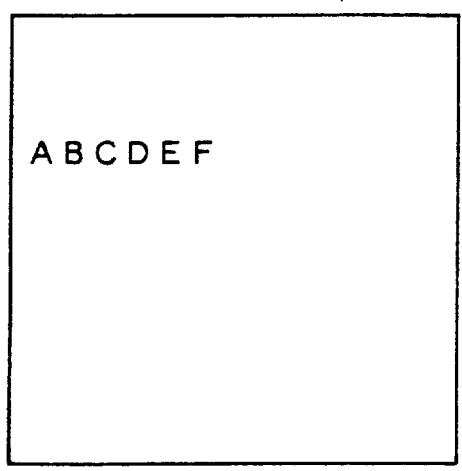
Figure 11D:
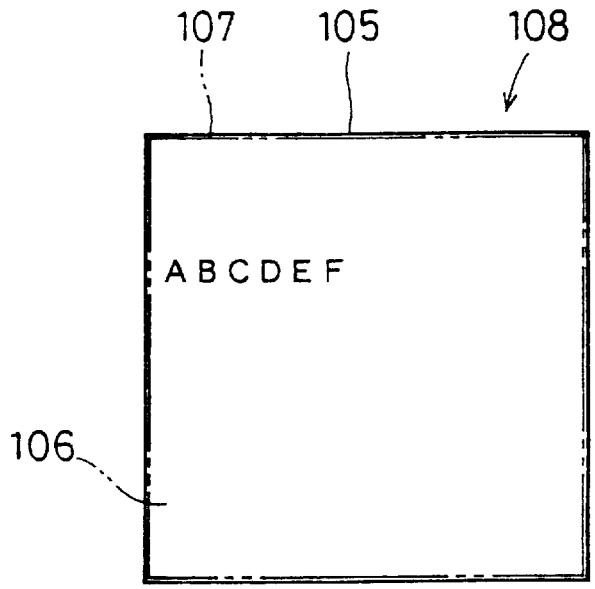

A shade elimination process to eliminate a black line caused by a shade of a document front-end from an image which is a result of reading a document will be illustrated below. In a conventional document reading unit, when a document 101 shown in FIG. 11A is read, an image 104 which includes a shade 103 of a document front-end as shown in FIG. 11B is obtained. In FIGS. 11A to 12D, a shade and a black line are shown by a diagonally shaded region. The shade elimination process is attained by, when a document front-end is detected by the document end detecting unit 1, eliminating an unnecessary black line between an image front-end 105 and a front-end 107 of a region 106 where a document is seen in an image, from an image which is a result of reading a document. Under circumstances where there is no skew in a document and no error in detection of a document front-end, when accumulation of data of the reflected light amount from the light-receiving elements 26 is started after timing detected by the detecting section 24 that the document front-end reaches the reference position, a shade of the document front-end is eliminated from an image with reliability. In other words, when a document 101 shown in FIG. 11C is read by using the document reading unit 2 of this embodiment, an image 108 in which a front-end 107 of a region 106 where a document is seen in an image coincides with an image front-end 105 as shown in FIG. 11D can be obtained.

Figure 12A:
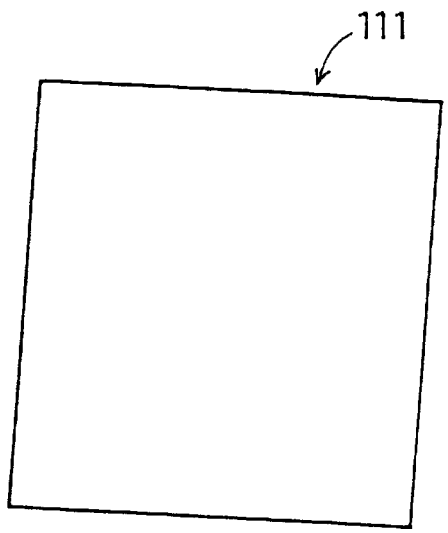
FIGS. 12A to 12D are views for explaining a process in consideration of a skew in the shade elimination process for eliminating a black. line caused by a shade of a document front-end from an image.
Figure 12B:
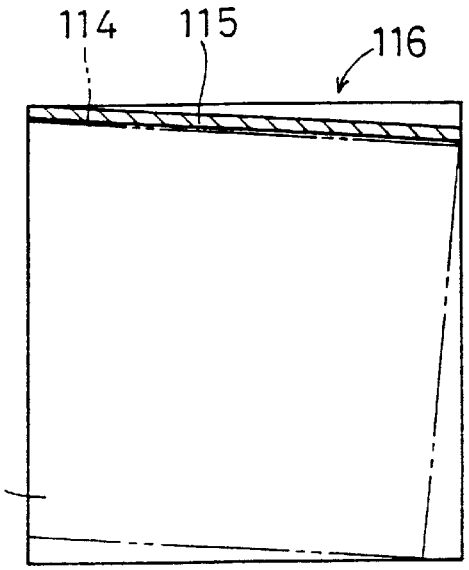

In a conventional document reading unit, part of a shade of a document front-end is seen in an image when there is a skew in the document and the document is read slantingly, and a whole shade of a document front-end is seen in an image when there is an error in detection of the document front-end. In other words, when a document 111 shown in FIG. 12A is read by using a conventional document reading unit, an image 116 which has a slanting black line 115 at a front-end 114 of a region 113 where a document is seen in an image as shown in FIG. 12B is obtained.

Figure 12C:
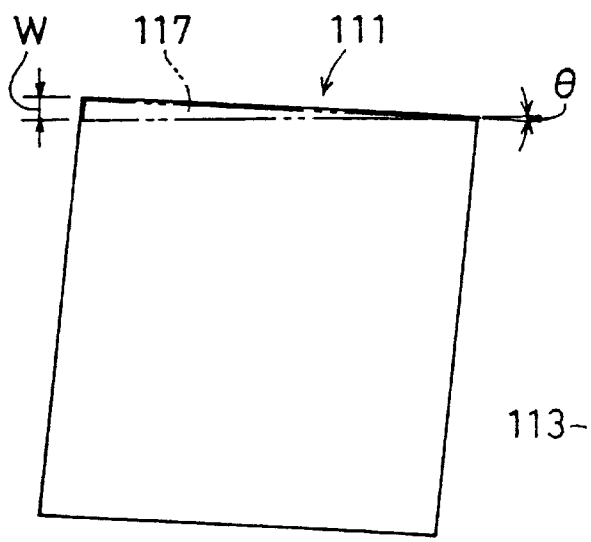
Figure 12D:
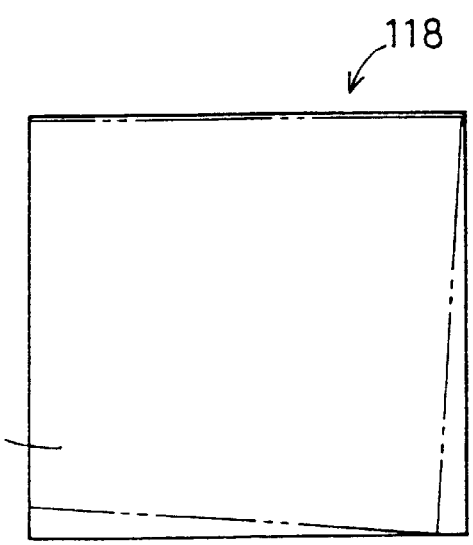

Considering a skew in a document and an error in detection of a document front-end, it is preferable to eliminate a portion which enters into a document by a predetermined width from a front-end at a document front-end portion, from an image which is a result of reading a document. To eliminate a document front-end portion from an image, timing of starting accumulation of data of the reflected light amount from the light-receiving elements 26 is set later than timing when a document front-end reaches the reference position. For this, the accumulation control section 31 sets timing of starting accumulation of data in the data accumulation section 13 later than timing detected by the detecting section 24 that a document front-end reaches the reference position, by a period of time required for a document to make a predetermined insertion loss width. As a result, when a document 111 with a skew as shown in FIG. 12C is read by using the document reading unit 2 of this embodiment, an image 118 in which a document front-end portion 117 is eliminated from a region 113 where a document is seen in an image as shown in FIG. 12D is obtained. By this, regardless of presence of a skew in a document, a shade caused by a document end is reliably eliminated from an image which is a result of reading a document, so that the quality of an image is more increased. For example, in the case where the arrangement density of lines in the main scanning direction of an image is 7.7 lines/mm, it is preferable that the width of a document front-end portion to be eliminated from the image, that is, an insertion loss width W of the document is 2 mm.

When the detecting section 24 detects a shade of a document front-end and detects a position of a document front-end individually at places where the respective slots 41 on the back member 21 are formed, it is possible to calculate the skew amount of a document. When the skew amount of a document is known, it is further preferable to remove a shade of a document front-end slantingly along the skew of a document. For this, the accumulation control section 31 calculates the skew amount θ of a document based on the difference in positions of a document front-end detected at the respective slots 41, and sets timing of starting accumulation of data in the data accumulation section 13 later than timing detected by the detecting section 24 that the document front-end reaches the reference position, by a period of time conforming to the calculated skew amount. This makes it possible to reduce the document front-end portion 117 not seen in an image because of removal of a shade, so that the document reading unit 2 is capable of minimizing a lack of information on a document due to removal of a shade in an image. To minimize the document front-end portion 117 not seen in an image, it is preferable, for example, to set the insertion loss width W to the product of a tangent of a skew angle θ and a length L of a document front-end (L×sin θ) so that the document front-end portion 117 becomes a triangle with the largest area whose one side is a document front-end.

The document end detecting unit 1, the document reading unit and the facsimile apparatus 3 of this embodiment are examples of the document end detecting unit 1, the document reading unit and the facsimile apparatus 3 according to the invention, which may be embodied in various ways as long as a major construction and operation thereof are not changed. In specific, a detailed construction and operation of each element of the document end detecting unit 1, the document reading unit and the facsimile apparatus 3 are not limited to the above construction and operation as long as the same effect can be attained, and may be embodied by another construction and operation. For example, the back member 21 may be a member like a flat board on one surface of which a slot is formed, instead of a roller.

The document end detecting unit 1, which is not limited to the one used for detection of a document end in order to control a data accumulation timing in the document reading unit 2, may be disposed to another unit which needs detection of a document end, or may be used singly. The document reading unit 2, which is not limited to the one embedded in a facsimile apparatus, maybe embedded in another unit, or maybe used singly as a scanner. An apparatus in which the document reading unit 2 is embedded is an image communication apparatus such as a facsimile apparatus, an image inputting terminal equipment, a copy machine, and an office equipment.

For example, a copy machine comprises, other than the document reading unit 2, a printing unit for printing an image shown by data obtained by the document reading unit 2. In such a copy machine, a document front-end is accurately detected, so that the precision in a process associated with timing when the document front-end reaches a reference position is increased. Further, an image inputting terminal equipment comprises, other than the document reading unit 2, a transfer unit which converts a form of image data obtained by the document reading unit 2 into a form conforming to an outside apparatus such as a computer and transfers the converted image data to the outside apparatus. In such an external inputting terminal equipment, a document front-end is accurately detected, so that the precision in a process associated with timing when the document front-end reaches a reference position is increased.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A document end detecting unit which detects one of an upstream end and downstream end in a moving direction of a document moving relatively to a predetermined reference position, the document end detecting unit comprising:

a light source for illuminating the reference position from a downstream side or upstream side in the moving direction of the document;

light-receiving means for receiving reflected light coming through the reference position;

a back member opposed to the light-receiving means and the light source across the reference position; and detecting means for detecting the one end of the document, wherein a slot whose longitudinal direction is substantially parallel to the moving direction of the document is provided on a surface of the back member, and the detecting means detects a shade of the one end of the document appearing at the slot of the back member based on a light-receiving result of the light-receiving means, and detects the one end of the document based on a result of detecting the shade.

2. The document end detecting unit of claim 1, wherein the detecting means detects disappearance timing of a shade of the downstream end in the moving direction of the document and regards the detected disappearance timing as timing when the downstream end in the moving direction of the document reaches the reference position.

3. The document end detecting unit of claim 1, wherein the detecting means detects appearance timing of a shade of the downstream end in the moving direction of the document and regards a point in time when the document has relatively moved a predetermined distance from a position thereof at the detected appearance timing as timing when the downstream end in the moving direction of the document reaches the reference position.

4. The document end detecting unit of claim 1, wherein the color of the surface of the back member and the inner wall of the slot is white;

the light-receiving means is composed of a plurality of light-receiving elements arranged in parallel to a direction which is substantially orthogonal to the moving direction of the document;

light reflected from the slot of the back member and light reflected from the surface of the back member excluding the slot are respectively received by one or more light-receiving elements; and the detecting means:

(1) judges whether the surface of the document is dark color or not based on the amount of reflected light received by a light-receiving element which should receive the light reflected from the surface of the back member excluding the slot, and (2) when the surface of the document is dark color, detects timing when the amount of reflected light received by the light-receiving element which should receive the light reflected from the surface of the back member excluding the slot becomes less than a predetermined light amount, and regards the detected timing as timing when the downstream end in the moving direction of the document reaches the reference position.

5. The document end detecting unit of claim 1, wherein the back member has a plurality of slots, and the detecting means performs detection of a shade of a document end and detection of a position of the document end individually at points where the slots of the back member are formed.

6. A document reading unit comprising:

the document end detecting unit of claim 1;

moving means for moving at least one of the light-receiving means and the document to be read so that the document moves relatively to the light-receiving means in the document end detecting unit while passing through the reference position;

data accumulation means for accumulating data of reflected light amount from the light-receiving means as data of density of pixels composing an image; and accumulation control means for causing the data accumulation means to start and finish accumulation of data in accordance with timing when the detecting means of the document end detecting unit detects either end of the document.

7. The document reading unit of claim 6, further comprising:

reference waveform producing means for producing a reference waveform used for shading correction; and shading correction means for subjecting data of the reflected light amount from the light-receiving means to shading correction using the reference waveform, wherein the light-receiving means is composed of a plurality of light-receiving elements arranged in parallel to a direction substantially orthogonal to the moving direction of the document, and the reference waveform producing means causes the light-receiving means to receive light reflected from a surface of the back member and regards an output waveform showing a relation between the reflected light amounts outputted from the respective light-receiving elements and positions of the respective light-receiving elements as the reference waveform.

8. The document reading unit of claim 7, wherein an inclination angle of a side wall of the slot of the back member to a bottom surface of the slot is more than 0° and less than 90°.

9. The document reading unit of claim 7, wherein a surface of a border portion between a side wall of the slot of the back member and the bottom surface of the slot is curved.

10. The document reading unit of claim 7, wherein a surface of a border portion between a side wall of the slot of the back member and a surface of the back member is curved.

11. The document reading unit of claim 7, wherein the reference waveform producing means corrects the shape of the output waveform to a shape to be obtained in the case where the back member has no slot, and regards the corrected output waveform as a reference waveform.

12. The document reading unit of claim 11, wherein the reference waveform producing means corrects part of the output waveform corresponding to the slot by interpolation of both sides of the part of the output waveform.

13. The document reading unit of claim 11, further comprising:

standard waveform storing means which previously stores a standard falling waveform showing a standard relation between the amount of light reflected from a back member having a slot and positions of the light-receiving elements and a standard reference waveform showing a standard relation between the amount of the light reflected from the back member having no slot and positions of the respective light-receiving elements, wherein the reference waveform producing means corrects the output waveform based on the standard falling waveform and the standard reference waveform.

14. The document reading unit of claim 6, wherein the accumulation control means sets timing of starting to accumulate data in the data accumulation means later than timing when either end of a document reaches the reference position, detected by the detecting means.

15. The document reading unit of claim 6, wherein the back member has a plurality of slots, the detecting means performs detection of a shade of a document end and detection of a position of either end of the document individually at points where the plurality of slots of the back member are formed, and the accumulation control means calculates the amount of skew of the document based on the difference in position of the document end detected at the plurality of slots, and sets timing of starting to accumulate data in the data accumulation means later than timing detected by the detecting means that either end of a document reaches the reference position, by a period of time corresponding to the calculated amount of skew.

16. The document reading unit of claim 6, wherein the back member is a roller which is capable of rotating about a rotation axis, and the moving direction of a document is orthogonal to an axial direction of the rotation axis.

17. A facsimile apparatus comprising:

the document reading unit of claim 6; and a communication unit for sending data of an image accumulated in the data accumulation means of the document reading unit to a communication unit capable of receiving data of an image.

* * * * *